United States Patent
Kawase

(10) Patent No.: US 9,435,664 B2
(45) Date of Patent: Sep. 6, 2016

(54) ROTATION ANGLE DETECTOR, ROTATION ANGLE DETECTION METHOD, AND IMAGE FORMING APPARATUS

(71) Applicant: Tatsuya Kawase, Kanagawa (JP)

(72) Inventor: Tatsuya Kawase, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 79 days.

(21) Appl. No.: 14/278,069

(22) Filed: May 15, 2014

(65) Prior Publication Data

US 2014/0354271 A1    Dec. 4, 2014

(30) Foreign Application Priority Data

May 29, 2013 (JP) .................................. 2013-113494
Dec. 12, 2013 (JP) .................................. 2013-257025
Mar. 3, 2014 (JP) .................................. 2014-040244

(51) Int. Cl.
   *G01B 7/30*     (2006.01)
   *G01D 5/245*    (2006.01)

(52) U.S. Cl.
   CPC ................................... *G01D 5/2451* (2013.01)

(58) Field of Classification Search
   CPC ...................................................... G01B 7/30
   USPC .................................................. 324/207.25
   See application file for complete search history.

(56) References Cited

U.S. PATENT DOCUMENTS

2002/0020229 A1* 2/2002 Nakamura et al. ...... 73/862.333
2014/0086611 A1* 3/2014 Nakagawa ..................... 399/88

FOREIGN PATENT DOCUMENTS

| JP | 2001-033277 | 2/2001 |
| JP | 2006-112859 | 4/2006 |
| JP | 2013-250084 | 12/2013 |

OTHER PUBLICATIONS

Partial Translation of JP 2001-033277, Feb. 2001.*

* cited by examiner

*Primary Examiner* — Bot Ledynh
(74) *Attorney, Agent, or Firm* — Oblon, McClelland, Maier & Neustadt, L.L.P.

(57) ABSTRACT

Provided are a rotation angle detector and a rotation angle detecting method. Each of the rotation angle detector and rotation angle detecting method detects a rotation angle of a rotating body according to a plurality of detection signals that vary depending on the rotation angle of the rotating body and have phases different from each other, to output the detected rotation angle as a detection angle, generates pseudo harmonics based on a multiplied detection angle obtained by multiplying the detection signal by a specified number, and removes the pseudo harmonics from the detection signals, to output a corrected detection signals from which the pseudo harmonics are removed to the detecting of the rotation angle, the detection angle being generated based on the correction detection signals.

11 Claims, 18 Drawing Sheets

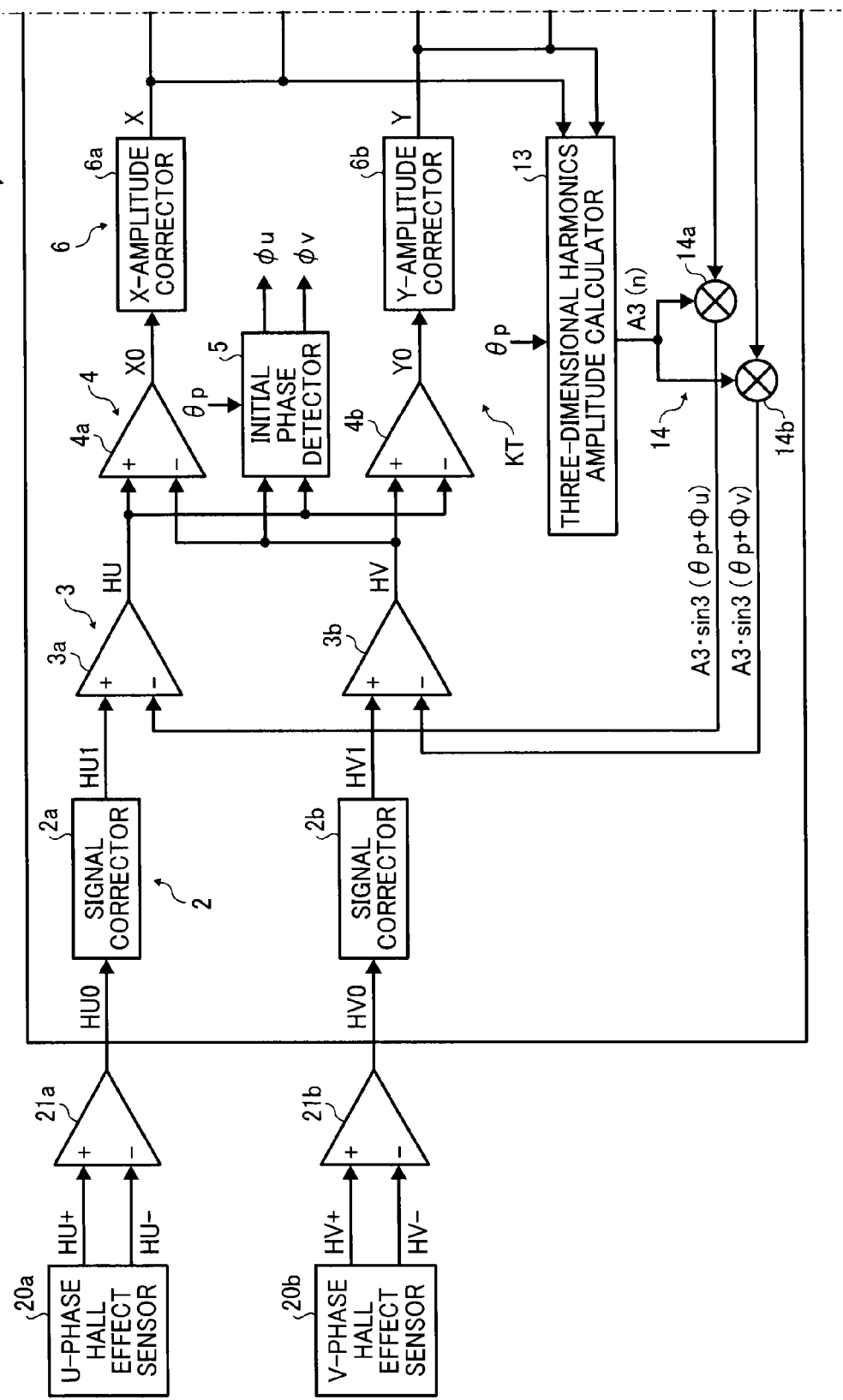

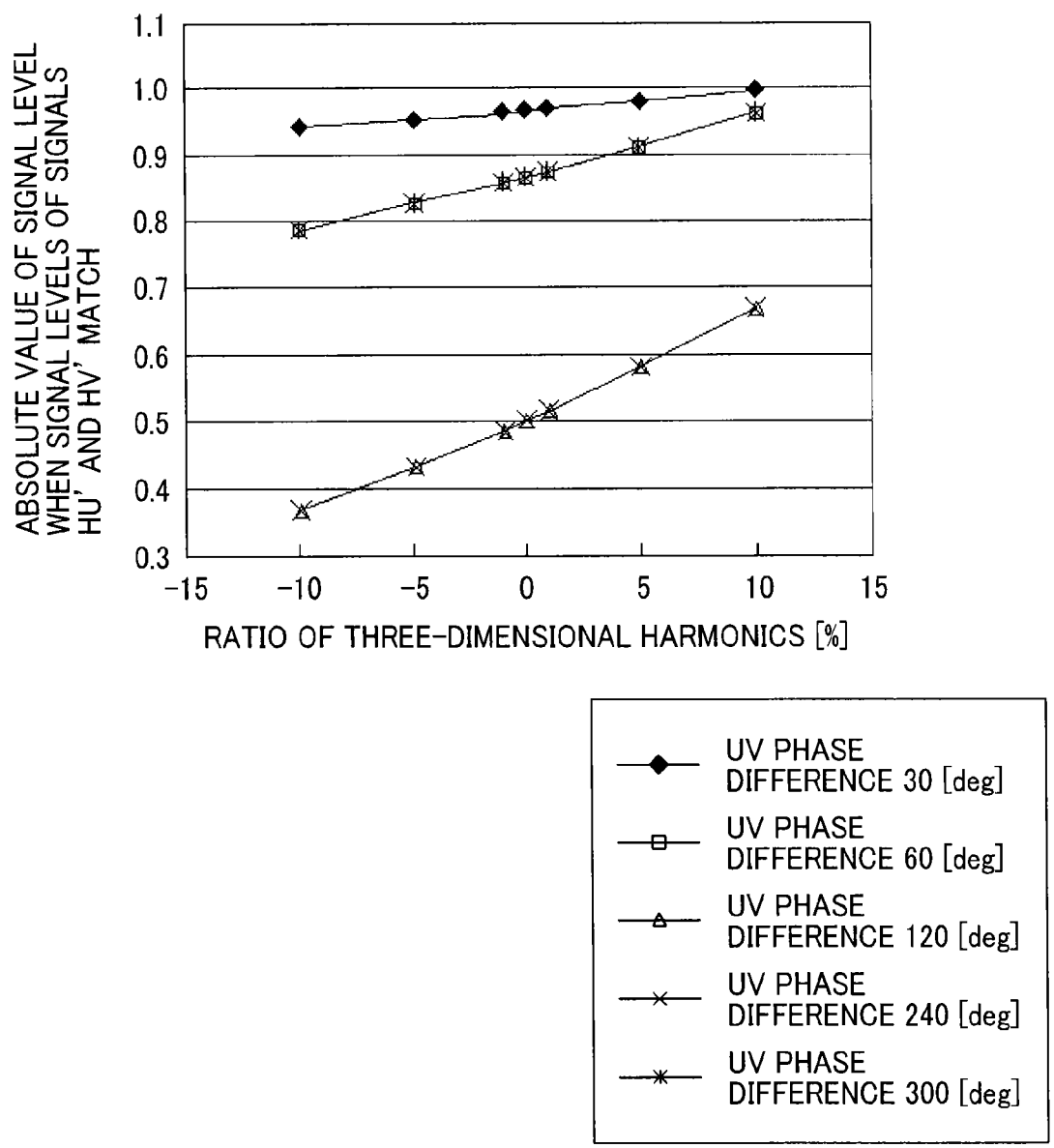

ROTATION ANGLE DETECTOR, ROTATION ANGLE DETECTION METHOD, AND IMAGE FORMING APPARATUS

CROSS-REFERENCE TO RELATED APPLICATIONS

This patent application is based on and claims priority pursuant to 35 U.S.C. §119(a) to Japanese Patent Application Nos. 2013-113494, filed on May 29, 2013, 2013-257025, filed on Dec. 12, 2013, and 2014-040244, filed on Mar. 3, 2014, in the Japan Patent Office, the entire disclosure of which is hereby incorporated by reference herein.

BACKGROUND

1. Technical Field

Example embodiments generally relate to a rotation angle detector, a rotation angle detecting method, and an image forming apparatus.

2. Background Art

In image processing apparatuses such as printers, facsimile machines, photocopiers, scanners, and multifunction printers (MFP), driving mechanisms are driven by drive motors. Accordingly, elements of an image processing apparatus are driven at specified speed to perform image processing such as image reading processes or image forming processes.

Conventionally, image processing apparatuses use magnetic encoders that include magnetic detectors to detect the rotation of rotating bodies, such that drive motors drive at a desired speed. The magnetic encoders serve as rotation angle detecting devices.

SUMMARY

Embodiments of the present invention described herein provide a rotation angle detector and a rotation angle detecting method. Each of the rotation angle detector and rotation angle detecting method detects a rotation angle of a rotating body according to a plurality of detection signals that vary depending on the rotation angle of the rotating body and have phases different from each other, to output the detected rotation angle as a detection angle, generates pseudo harmonics based on a multiplied detection angle obtained by multiplying the detection signal by a specified number, and removes the pseudo harmonics from the detection signals, to output a corrected detection signals from which the pseudo harmonics are removed to the detecting of the rotation angle, the detection angle being generated based on the correction detection signals.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIGS. 1A and 1B are a circuit diagram of a rotation angle detector to which the first embodiment of the present invention is applied.

FIG. 16 depicts the relationship between the ratio of three-dimensional harmonics and the absolute value of a signal level when signal levels of corrected detection signals HU' and HV' match, for several phase differences.

Figure 1B:
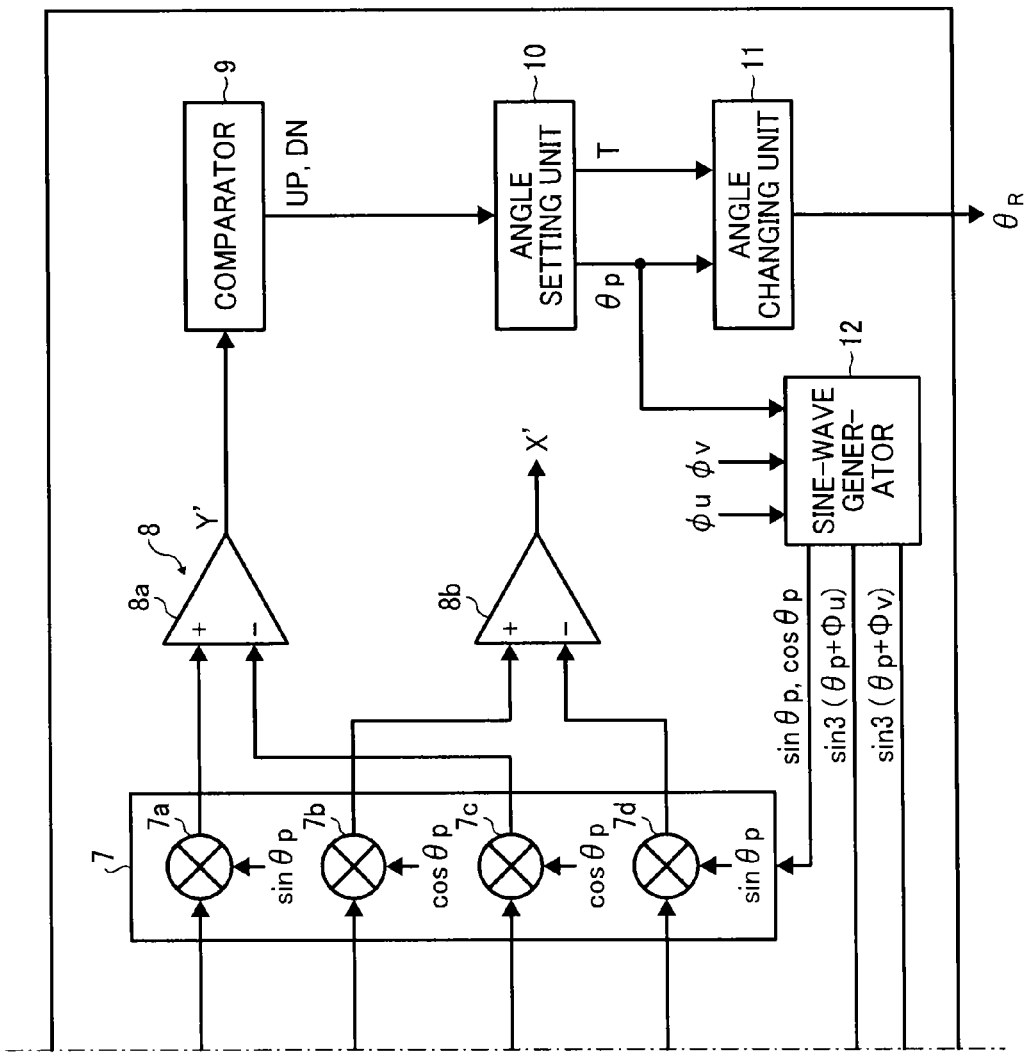

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits (ASICs), field programmable gate arrays (FPGAs) computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments of the present invention are described below in detail with reference to the drawings.

Embodiment 1

FIGS. 1 to 12 illustrate a rotation angle detector, a rotation angle detecting method, and an image forming apparatus, according to the first embodiment of the present invention.

FIGS. 1A and 1B are a circuit diagram of a rotation angle detector 1 to which a rotation angle detector, a rotation angle detecting method, and an image forming apparatus according to the first embodiment of the present invention is applied.

As illustrated in FIGS. 1A and 1B, the rotation angle detector 1 includes a signal corrector 2, an arithmetic unit 3, an orthogonalization unit 4, an initial phase detector 5, an amplitude corrector 6, a detected-angle multiplier 7, an adder/subtracter 8, a comparator 9, an angle setting unit 10, an angle changing unit 11, a sine-wave generator 12, a three-dimensional harmonics amplitude calculator 13, and a pseudo three-dimensional harmonics generator 14. The rotation angle detector 1 is applied to an image processing apparatus such as an MFP, and is used to detect the rotation angle of a rotation axis of a drive motor such as a brushless motor of an image processing apparatus.

The rotation angle detector 1 receives rotation detection signals HU0 and HV0 from a U-phase hall effect sensor 20a and a V-phase hall effect sensor 20b, respectively, through differential amplifiers 21a and 21b, respectively.

Figure 2:
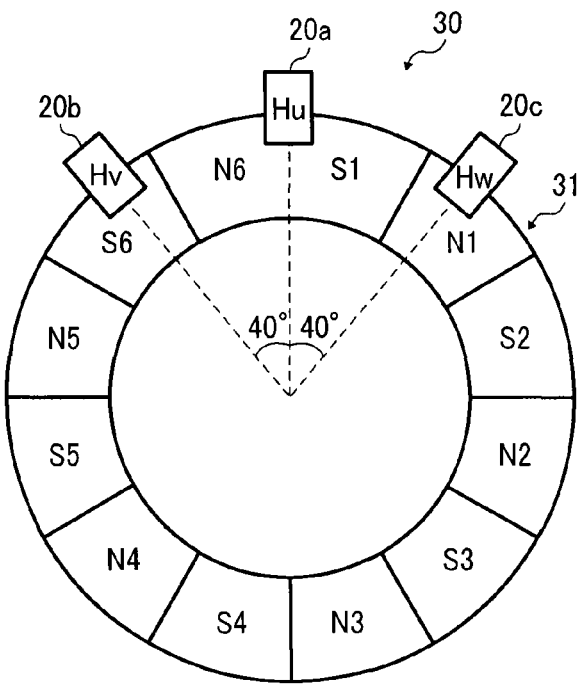
FIG. 2 illustrates an outline of a brushless DC motor, according to an example embodiment of the present invention.

FIG. 2 illustrates an outline of a brushless direct current (DC) motor 30, according to the first embodiment. As illustrated in FIG. 2, the U-phase hall effect sensor 20a and the V-phase hall effect sensor 20b are attached to a brushless DC motor (rotating mechanism) 30. Moreover, a W-phase hall effect sensor 20c is attached to the brushless DC motor 30.

In other words, the rotation angle detector 1 detects the rotation angle of a rotating body 31, which is the rotation axis of the brushless DC motor 30. Note that this rotation angle is referred to as a rotation angle $\theta$ in the following description.

As illustrated in FIG. 2, the brushless DC motor 30 usually involves phase differences of 120 degrees when twelve poles with three phases are adopted. The brushless DC motor 30 includes Y-connected three-phase coils of U-phase, V-phase, and W-phase, and the rotating body 31 that is a permanent magnet in which S-poles and N-poles are alternately arranged with 30 degree intervals. The brushless DC motor 30 drives by appropriately commutating the driving current of U-phase, V-phase, and W-phase depending on the angle of the rotating body 31. In order to drive the rotating body 31, the brushless DC motor 30 perpendicularly applies voltage to the direction of magnetic flux and the direction in which the signals detected by the hall effect sensors 20a, 20b, and 20c are output. Note that such application of voltage is not illustrated in FIG. 2.

The rotation angle detector 1 and the brushless DC motor 30 are applied to an image processing apparatus such as an MFP, and a driving mechanism of the image processing apparatus is connected to the rotation axis of the rotating body 31.

The hall effect sensors 20a, 20b, and 20c are fixed at specified positions close to the rotating body 31, and output detection signals HU+/HU−, HV+/HV−, and HW+/HW− of U-phase, V-phase, and W-phase that vary depending on the magnetic field of the rotating body 31. In the first embodiment, the hall effect sensors 20a, 20b, and 20c are arranged with 40 degree intervals. However, the arrangement of the hall effect sensors 20a, 20b, and 20c is not limited to this configuration. In such a three-phase brushless motor, the hall effect sensors 20a, 20b, and 20c of U-phase, V-phase, and W-phase are arranged with $2\pi/3$ intervals for the angle of every cycle of an S-pole and an N-pole. In the first embodiment, the brushless motor 30 has the rotating body 31 with six pairs of two poles (twelve poles). However, the configuration of the brushless motor 30 is not limited to this configuration.

Figure 3:
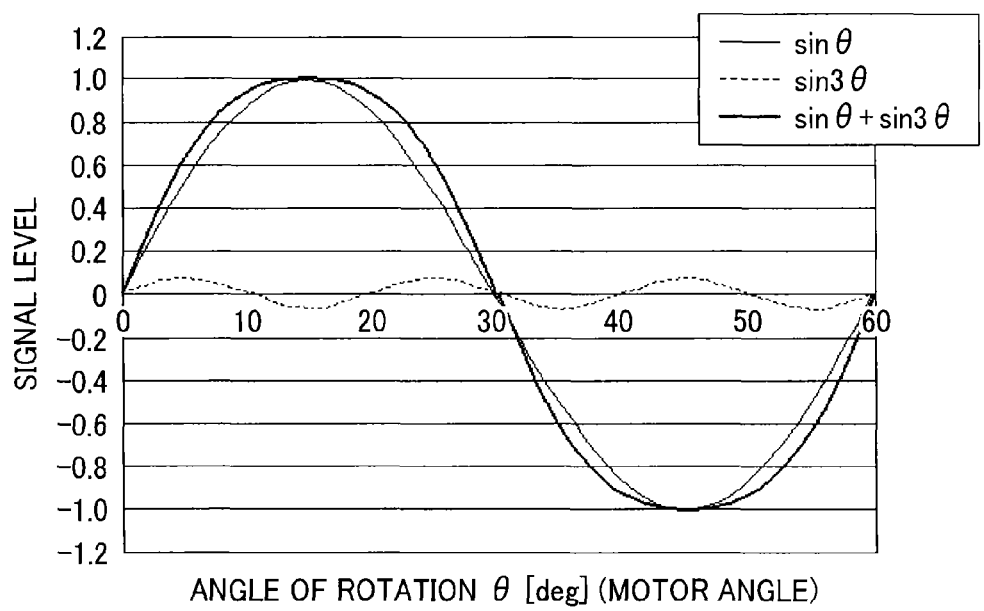
FIG. 3 depicts an example of signals detected by a hall effect sensor, according to an example embodiment of the present invention.

FIG. 3 depicts an example of signals detected by the hall effect sensors 20a, 20b, and 20c, according to the first embodiment. The hall effect sensors 20a, 20b, and 20c output the detected signals in which three-dimensional harmonics are superimposed. In FIG. 3, a fine-line curve of sin $\theta$ indicates detection signal on which three-dimensional harmonics are not superimposed, and this detection signal shows a sine-wave shape for every cycle of a pair of S-pole and N-pole. The brushless DC motor 30 of FIG. 2 has six pairs of two poles (twelve poles), and thus a detection signal indicates a sine wave of six cycles for every rotation of the rotating body 31. In FIG. 3, a bold-line curve (sin $\theta$+sin 3$\theta$) indicates detection signal on which three-dimensional harmonics are superimposed, and this detection signal shows a sine-wave for every cycle of a pair of S-pole and N-pole to which three-cycle sine waves (three-dimensional harmonics) indicated by a broken line are added. For comparison purposes, in FIG. 3, the amplitude is equally matched between the detection signal sin θ on which three-dimensional harmonics are not superimposed and the detection signal (sin θ+sin 3θ) on which three-dimensional harmonics (sine 3θ) are superimposed. In FIG. 3, three-dimensional harmonics are superimposed by 7%. Harmonics are superimposed on the detection signals of the hall effect sensors 20a, 20b, and 20c to compensate for uneven magnetization of the rotating body 31 or a difference in position at which the hall effect sensors 20a, 20b, and 20c are disposed.

As seen from FIG. 3, the crest of the sine wave of a detection signal on which three-dimensional harmonics are superimposed expands outward in comparison to that of a detection signal on which three-dimensional harmonics are not superimposed.

In the first embodiment, the U-phase hall effect sensor 20a, the V-phase hall effect sensor 20b, and the W-phase hall effect sensor 20c may be dedicatedly provided for detecting the brushless DC motor 30. In any case, the hall effect sensors 20a, 20b, and 20c transmit U-phase detection signals HU+ and HU−, V-phase detection signals HV+ and HV−, and W-phase detection signals HW+ and HW− to the differential amplifiers 21a and 21b, and another differential amplifier, respectively.

The differential amplifiers 21a and 21b, and the other differential amplifier convert those detection signals into single-end signals, and output the single-end detection signals HU0, HV0, and HW0, as shown below as formula 1, to the rotation angle detector 1.

$$HU0 = A_1 \sin(\theta + \phi u) + A_3 \sin 3(\theta + \phi u)$$

$$HV0 = A_1 \sin(\theta + \phi v) + A_3 \sin 3(\theta + \phi v)$$

$$HW0 = A_1 \sin(\theta + \phi w) + A_3 \sin 3(\theta + \phi w) \quad \text{[Formula 1]}$$

Here, $A_1$ and $A_3$ indicate amplitude, and it is assumed in those detection signals of U-phase, and V-phase, and W-phase that there is no offset and no difference in amplitude and phase. Moreover, the detection angle θ is based on the premise that one cycle of a detection signal is 2π, and in the first embodiment, V-phase initial phase φv and W-phase initial phase φw are φv=−2π/3 and φv=−2π/3, respectively, when U-phase initial phase φu is 0.

Among the detection signals HU0, HV0, and HW0, two detection signals HU0 and HV0 on which three-dimensional harmonics are superimposed are input to the rotation angle detector 1.

Ideally, the detection signals output from the hall effect sensors 20a, 20b, and 20c show regular sine waves. However, in actuality, those detection signals show sine waves on which three-dimensional harmonics are superimposed, which vary depending on the rotation angle θ of the rotating body 31. Such variation is also influenced by uneven magnetization of the rotating body 31 or a difference in position at which the hall effect sensors 20a, 20b, and 20c are disposed. As described later, the rotation angle detector 1 removes the effect caused by three-dimensional harmonics to precisely detect the rotation angle θ of the rotating body 31 according to the detection signals received from the hall effect sensors 20a and 20b.

In FIGS. 1A and 1B, the signal corrector 2 of the rotation angle detector 1 includes signal correctors 2a and 2b. The signal correctors 2a and 2b receives the detection signals HU0 and HV0 that are received by the U-phase hall effect sensor 20a and the V-phase hall effect sensor 20b and are converted into single-end signals by the differential amplifiers 21a and 21b.

The signal correctors 2a and 2b correct the amplitude of signals so as to match target amplitude Atgt, and remove the offset of these signals. Then, the signal correctors 2a and 2b output the resultant signals to an arithmetic unit 3 as corrected detection signals HU1 and HV1.

In other words, the signal corrector 2a detects an absolute value HU0peak of the peak value of the detection signal HU0, and divides Atgt by HU0peak to obtain a correction gain Gu (Gu=Atgt/HU0peak). Then, the signal corrector 2a multiplies the detection signal HU0 by the calculated correction gain Gu to generate a corrected detection signal HU1 in which the amplitude matches the target amplitude Atgt. Further, the signal corrector 2a detects a top peak HU0pkp of the detection signal HU0 and a bottom peak HU0pkm of the detection signal HU0, and calculates correction offset ofsu as follows. ofsu=(HU0pkp+HU0pkm)/2 Then, the signal corrector 2a removes offset by subtracting the correction offset ofsu from the detection signal HU0. In a similar manner to the signal corrector 2a, the signal corrector 2b detects an absolute value HV0peak of the peak value of the detection signal HV0, and divides Atgt by HV0peak to obtain a correction gain Gv (Gv=Atgt/HV0peak). Then, the signal corrector 2b multiplies the detection signal HV0 by the calculated correction gain Gv to generate a corrected detection signal HV1 in which the amplitude matches the target amplitude Atgt. Further, the signal corrector 2b detects a top peak HV0pkp of the detection signal HV0 and a bottom peak HV0pkm of the detection signal HV0, and calculates correction offset ofsu as follows. ofsu=(HV0pkp+HV0pkm)/2 Then, the signal corrector 2b removes offset by subtracting the correction offset ofsu from the detection signal HV0.

The three-dimensional harmonics amplitude calculator 13 operates based on the premise that the amplitude of the corrected detection signals HU1 and HV1 match the target amplitude Atgt and there is no offset. The three-dimensional harmonics amplitude calculator 13 is described later in detail. For this reason, it is desired that the signal correctors 2a and 2b of the signal corrector 2 perform an offset removal process and an amplitude correction process at least one time as described above.

The arithmetic unit (harmonics removal unit) 3 includes subtracters 3a and 3b, and the subtracters 3a and 3b receives the corrected detection signal HU1 and the corrected detection signal HV1 from the signal correctors 2a and 2b, respectively. The arithmetic unit 3 removes three-dimensional harmonics from the corrected detection signal HU1 and the corrected detection signal HV1, and transmits the resultant signals to the orthogonalization unit 4.

Accordingly, the subtracter 3a receives pseudo three-dimensional harmonics A3·sin 3(θp+φu) from the pseudo three-dimensional harmonics generator 14 as pseudo harmonics. The pseudo three-dimensional harmonics generator 14 is described later in detail. The subtracter 3a removes the pseudo three-dimensional harmonics A3·sin 3(θp+φu) from the corrected detection signal HU1 to generate a removed detection signal HU from which three-dimensional harmonic components of the corrected detection signal HU1 are removed. Then, the subtracter 3a transmits the generated removed detection signal HU to the orthogonalization unit 4 and the initial phase detector 5. The subtracter 3b receives pseudo three-dimensional harmonics A3·sin 3(θp+φv) from the pseudo three-dimensional harmonics generator 14. The subtracter 3b removes the pseudo three-dimensional harmonics A3·sin 3(θp+φv) from the corrected detection signal HV1 to generate a removed detection signal HV from which three-dimensional harmonic components of the corrected detection signal HV1 are removed. Then, the subtracter 3b transmits the generated removed detection signal HV to the orthogonalization unit 4 and the initial phase detector 5.

In the first embodiment, the sine-wave generator 12 generates a sine wave similar to that of the three-dimensional harmonics included in the corrected detection signal HU1 and the corrected detection signal HV1, the arithmetic unit 3 removes harmonics by subtracting the generated sine wave from the corrected detection signal HU1 and the corrected detection signal HV1. However, the removal process of three-dimensional harmonics is not limited to this configuration. For example, three-dimensional harmonics may be removed as follows. The arithmetic unit 3 is configured to be an adder, the sine-wave generator 12 generates a sine wave whose phase is opposite the three-dimensional harmonics included in the corrected detection signal HU1 and the corrected detection signal HV1. Then, the adder adds the generated sine wave to the corrected detection signal HU1 and the corrected detection signal HV1.

The orthogonalization unit 4 includes a summing amplifier 4a and a differential gain amplifier 4b. The orthogonalization unit 4 orthogonalizes the removed detection signal HU and the removed detection signal HV to generate an X-axis orthogonal signal X0 and a Y-axis orthogonal signal. Then, the generate X-axis orthogonal signal and Y-axis orthogonal signal are output to the amplitude corrector 6.

In other words, the summing amplifier 4a calculates the sum of the received removed detection signal HU and the removed detection signal HV to generate an X-axis orthogonal signal X0, and outputs the generated X-axis orthogonal signal to the amplitude corrector 6. The differential gain amplifier 4b receives a removed detection signal HV at the plus terminal, and receives a removed detection signal HU at the minus terminal. Then, the differential gain amplifier 4b subtracts the removed detection signal HU from the removed detection signal HV to generate a Y-axis orthogonal signal Y0, and outputs the generated Y-axis orthogonal signal to the amplitude corrector 6.

In other words, the orthogonalization unit 4 uses the summing amplifier 4a and the differential gain amplifier 4b to calculate an X-axis orthogonal signal X0 and a Y-axis orthogonal signal Y0 based on the removed detection signal HU and the removed detection signal HV, as shown below as formula 2. As a result, are generated. For the purpose of clarification, in formula 2, it is assumed that the initial phases φu and φv are 0 and φ(φu=0, φv=φ), respectively, the rotation angle detector 1 is just started, and that three-dimensional harmonics are not removed.

$$X0 = HV + HU$$
$$= 2A_1\cos(\varphi/2)\cdot\sin(\theta+\varphi/2) + 2A_3\cos(3\varphi/2)\cdot\sin(3\theta+3\varphi/2)$$

$$Y0 = HV - HU$$
$$= 2A_1\sin(\varphi/2)\cdot\cos(\theta+\varphi/2) + 2A_3\sin(3\varphi/2)\cdot\cos(3\theta+3\varphi/2)$$

[Formula 2]

The X-axis orthogonal signal X0 and the Y-axis orthogonal signal Y0 are orthogonal to each other.

Figure 4:
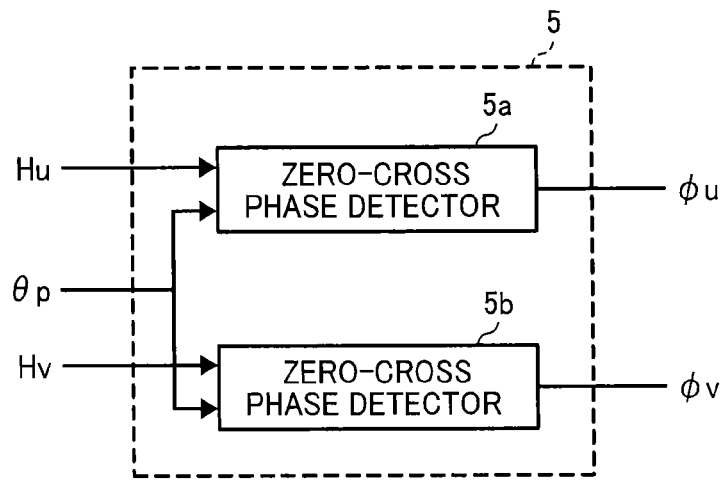
FIG. 4 is a block diagram of an initial phase detector, according to an example embodiment of the present invention.

FIG. 4 is a block diagram of an initial phase detector according to the first embodiment. As depicted in FIG. 4, the initial phase detector 5 includes two zero-cross phase detectors 5a and 5b. The zero-cross phase detectors 5a and 5b receive the removed detection signal HU and the removed detection signal HV, respectively, and receive a detection angle θp from the angle setting unit 10. The angle setting unit 10 is described later in detail. The initial phase detector 5 generates initial phases φu and φv for the removed detection signal HU and the removed detection signal HV, based on the detection angle θp, and supplies the generated initial phases φu and φv to the sine-wave generator 12 for the generation of a pseudo three-dimensional harmonics.

In other words, the zero-cross phase detector 5a detects a phase of zero cross where the sine wave of the removed detection signal HU changes from a negative phase to a positive phase, or the other way round, as the detection angle θp changes. Then, the zero-cross phase detector 5a transmits the detected phase of zero cross as an initial phase φu. The zero-cross phase detector 5b detects a phase of zero cross where the sine wave of the removed detection signal HV changes from a negative phase to a positive phase, or the other way round, as the detection angle θp changes. Then, the zero-cross phase detector 5a transmits the detected phase of zero cross as an initial phase φv.

Figure 5:
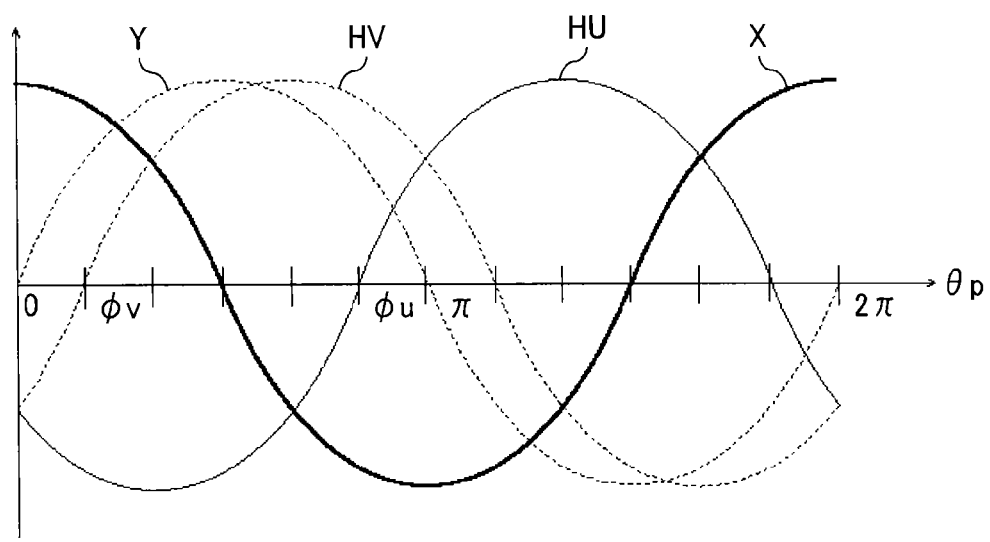
FIG. 5 illustrates the phase relation between orthogonal signals and the detection angle, and the phase relation between removed detection signals and the detection angle, according to an example embodiment of the present invention.

FIG. 5 illustrates the phase relation between orthogonal signals and the detection angle, and the phase relation between removed detection signals and the detection angle, according to the first embodiment. More specifically, FIG. 5 illustrates the relationship between the removed detection signal HU and the removed detection signal HV, and the detection angle θp, where it is assumed that the rotation angle θ of the rotating body 31 is detected with reference to a corrected X-axis orthogonal signal X and a corrected Y-axis orthogonal signal Y. The corrected X-axis orthogonal signal X and the corrected Y-axis orthogonal signal Y are described later in detail. As illustrated in FIG. 5, assuming that the removed detection signal HU and the removed detection signal HV are sine waves, initial phases φu and φv of the sine waves of the removed detection signal HU and the removed detection signal HV can be determined with reference to the detection angle θp by detecting a phase of zero cross from a negative phase to a positive phase in the ascending direction of the detection angle θp or a phase of zero cross from a positive phase to a negative phase in the descending direction of the detection angle θp. Accordingly, the zero cross detectors 5a and 5b detect detection angles θp where the removed detection signal HU and the removed detection signal HV form zero crosses, and output the detected detection angles θp as the initial phases φu and φv of the removed detection signal HU and the removed detection signal HV.

Alternatively, the initial phase detector 5 may determine initial phases φu and φv by detecting a phase of zero cross from a negative phase to a positive phase in the descending direction of the detection angle θp or a phase of zero cross from a positive phase to a negative phase in the ascending direction of the detection angle θp. The initial phase detector 5 may perform both operations as above.

As illustrated in FIGS. 1A and 1B, the amplitude corrector 6 includes an X-amplitude corrector 6a and a Y-amplitude corrector 6b. The X-amplitude corrector 6a and the Y-amplitude corrector 6b receive an X-axis orthogonal signal X0 and a Y-axis orthogonal signal Y0 from the summing amplifier 4a and the differential gain amplifier 4b of the orthogonalization unit 4, respectively. The amplitude corrector 6 multiplies the X-axis orthogonal signal X0 and the Y-axis orthogonal signal Y0 by gain such that the amplitude of the X-axis orthogonal signal X0 and the Y-axis orthogonal signal Y0 matches a specified target amplitude Atgt. By so doing, a corrected X-axis orthogonal signal X and a corrected Y-axis orthogonal signal Y are generated. Then, the amplitude corrector 6 transmits the generated corrected X-axis orthogonal signal and Y-axis orthogonal signal to the detected-angle multiplier 7 and the three-dimensional harmonics amplitude calculator 13.

In other words, the X-amplitude corrector 6a detects a peakX0peak of the X-axis orthogonal signal X0, and generates correction gain Gx (Gx=Atgt/X0peak). Further, the X-amplitude corrector 6a multiplies the X-axis orthogonal signal X0 by the generated correction gain Gx to generate a corrected X-axis orthogonal signal X. In other words, the Y-amplitude corrector 6b detects a peakY0peak of the Y-axis orthogonal signal Y0, and generates correction gain Gy (Gy=Atgt/Y0peak). Further, the Y-amplitude corrector 6b multiplies the Y-axis orthogonal signal Y0 by the generated correction gain Gy to generate a corrected Y-axis orthogonal signal Y.

Figure 6:
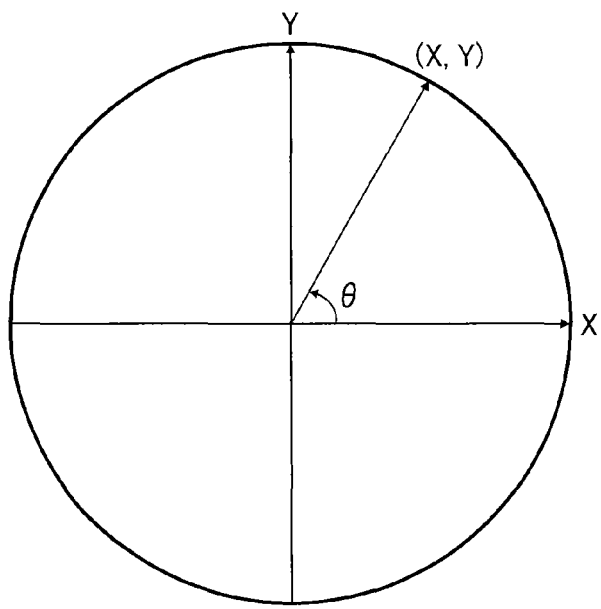
FIG. 6 depicts an example of a vector determined by a corrected X-axis orthogonal signal X and a corrected Y-axis orthogonal signal Y, according to an example embodiment of the present invention.

FIG. 6 depicts an example of a vector determined by the corrected X-axis orthogonal signal X and the corrected Y-axis orthogonal signal Y, according to the first embodiment. The corrected X-axis orthogonal signal X and the corrected Y-axis orthogonal signal Y are orthogonal to each other, and the amplitude of the corrected X-axis orthogonal signal X matches the amplitude of the corrected Y-axis orthogonal signal Y. Accordingly, as illustrated in FIG. 6, the phase of a detection signal can be expressed by angle θ of the vector composed of the corrected X-axis orthogonal signal X and the corrected Y-axis orthogonal signal Y. In other words, the summing amplifier 4a and the differential gain amplifier 4b of the orthogonalization unit 4 serve as a vector calculation unit that calculates vector. Note that when the phases of the detection signals HU0 and HV0 are orthogonal to each other, the summing amplifier 4a and the differential gain amplifier 4b, i.e., the orthogonalization unit 4, are not necessary.

The detected-angle multiplier 7 receives the corrected X-axis orthogonal signal X and the corrected Y-axis orthogonal signal Y from the amplitude corrector 6, and also receives sine waves sin θp and cos θp from the sine-wave generator 12. The sine waves sin θp and cos θp are sine waves at detection angle θp determined by the operation of the rotation angle detector 1, and the sine-wave generator 12 is described later in detail. Then, the detected-angle multiplier 7 multiplies the corrected X-axis orthogonal signal X and the corrected Y-axis orthogonal signal Y by the sine waves sin θp and cos θp, and transmits the resultant signals to the adder/subtracter 8.

More specifically, the detected-angle multiplier 7 includes a sine-wave multiplier 7a, cosine-wave multipliers 7b and 7c, and a sine-wave multiplier 7d. The sine-wave multiplier 7a receives the corrected X-axis orthogonal signal X and the sine wave sin θp, and multiplies the corrected X-axis orthogonal signal X by the sine wave sin θp. Then, the sine-wave multiplier 7a transmits the resultant signal to the adder/subtracter 8. The cosine-wave multiplier 7b receives the corrected X-axis orthogonal signal X and the sin wave cos θp, and multiplies the corrected X-axis orthogonal signal X by the sine wave cos θp. Then, the cosine-wave multiplier 7b transmits the resultant signal to the adder/subtracter 8. The cosine-wave multiplier 7c receives the corrected Y-axis orthogonal signal Y and the cosine wave cos θp, and multiplies the corrected Y-axis orthogonal signal Y by the cosine wave cos θp. Then, the cosine-wave multiplier 7c transmits the resultant signal to the adder/subtracter 8. The sine-wave multiplier 7d receives the corrected Y-axis orthogonal signal Y and the sine wave sin θp, and multiplies the corrected Y-axis orthogonal signal Y by the sine wave sin θp. Then, the sine-wave multiplier 7d transmits the resultant signal to the adder/subtracter 8.

The adder/subtracter 8 includes a subtracter 8a and an adder 8b. The subtracter 8a receives the result of multiplication from the sine-wave multiplier 7a and the cosine-wave multiplier 7c, and the adder 8b receives the result of multiplication from the cosine-wave multiplier 7b and the sine-wave multiplier 7d. The adder/subtracter 8 performs adding/subtracting processes on the multiplication result received from the detected-angle multiplier 7, and generates rotation vectors X' and Y'. Then, the adder/subtracter 8 transmits the generated rotation vector Y' to the comparator 9.

In other words, the subtracter 8a generates a rotation vector Y' by subtracting the multiplication result of the cosine-wave multiplier 7c from the multiplication result of the sine-wave multiplier 7a, as shown in formula 3 below. Then, the subtracter 8a transmits the generated rotation vector Y' to the comparator 9.

$$Y' = -X \cdot \sin \theta p + Y \cdot \cos \theta p \qquad \text{[Formula 3]}$$

The adder 8b generates a rotation vector X' by adding the multiplication result of the cosine-wave multiplier 7b to the multiplication result of the sine-wave multiplier 7d, as shown in formula 4 below. Then, the adder 8b transmits the generated rotation vector X'.

$$X' = X \cdot \cos \theta p + Y \cdot \sin \theta p \qquad \text{[Formula 4]}$$

Figure 7:
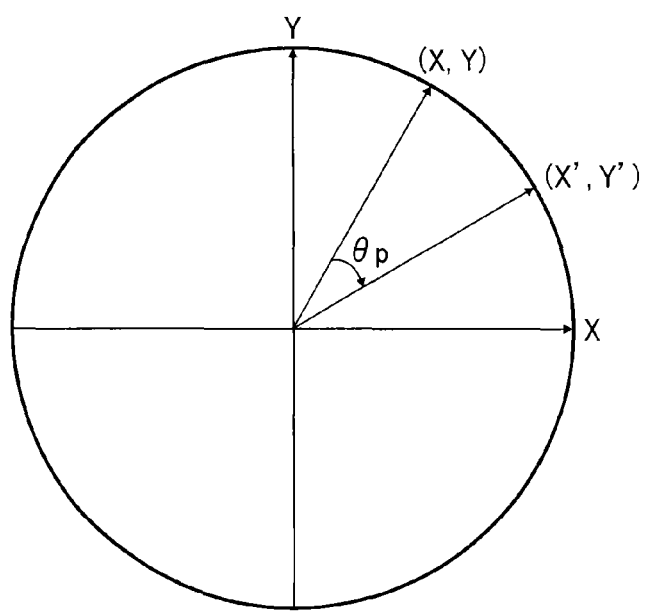
FIG. 7 depicts an example of a vector determined by a rotation vector, according to an example embodiment of the present invention.

The formulas 3 and 4 are used to rotate the vector composed of the corrected X-axis orthogonal signal X and the corrected Y-axis orthogonal signal Y clockwise by the detection angle θp. Accordingly, as illustrated in FIG. 7, the vector composed of the rotation vector X' and the rotation vector Y' is determined by rotating the vector composed of the corrected X-axis orthogonal signal X and the corrected Y-axis orthogonal signal Y clockwise by the detection angle θp.

When the rotation angle θ is equal to the detection angle θp (θ=θp), the value of the rotation vector Y' is zero. Thus, the value of the rotation vector X' is equal to that of the target amplitude Atgt in formula 1.

The rotation angle detector 1 according to the first embodiment monitors the values of the calculated rotation vectors X' and Y', and adjusts the detection angle θp. The rotation angle detector 1 consistently adjusts the detection angle θp such that X'=Atgt and Y'=0, and calculates the phases of the detection signals HU0 and HV0 based on the values of the adjusted detection angle θp.

The rotation angle detector 1 according to the first embodiment is described based on the premise that θ=θp, i.e., the reference angle is 0°. However, the angles depicted in FIGS. 6 and 7 are not directly relevant. Accordingly, the changes in angle depicted in FIGS. 6 and 7 correspond to the detection signals HU0 and HV0, and the reference angle is not limited to 0°.

The comparator 9 receives the rotation vector Y' from the subtracter 8a of the adder/subtracter 8 as a result of subtraction, and determines whether or not the value of the rotation vector Y' is zero. Then, the comparator 9 transmits an UP signal and a DN signal to the angle setting unit 10 to change the value set to the detection angle θp, based on the result of determination.

The angle setting unit 10 refers to a unit-base rotation angle θstep, and determines a detection angle θp based on the UP signal and DN signal output from the comparator 9. Then, the angle setting unit 10 transmits the detection angle θp to the sine-wave generator 12 or other relevant elements. The angle setting unit 10 also transmits the detection angle θp and the cycle count signal T to the angle changing unit 11. Here, the unit-base rotation angle θstep is a unit-base rotation angle used to rotate the rotation vectors X' and Y' when the detection angle θp is determined. The unit-base rotation angle θstep is stored in an internal memory or the like of the angle setting unit 10 in advance. The cycle count signal T iteratively counts 0 to 5.

The angle changing unit 11 receives the detection angle θp and the cycle count signal T from the angle setting unit 10, and converts the detection angle θp into a rotation angle θR of the rotating body 31. Then, the rotation angle θR is output.

Accordingly, one cycle of the rotating body 31 illustrated in FIG. 2 corresponds to six cycles of sine-wave detection signals HU+/HU−, HV+/HV−, and HW+/HW− received from the hall effect sensors 20a, 20b, and 20c. Because the value of the detection angle θp output from the angle setting unit 10 is determined based on the detection signals output from the hall effect sensors 20a, 20b, and 20c, the detection angle θp is not the rotation angle of the rotating body 31 but is an angle that indicates the phase of one cycle of a detection signal.

The angle changing unit 11 determines to which one of the six cycles of sine-wave detection signals the rotational position of the rotating body 31 corresponds, according to the cycle count signal T that iteratively counts 0 to 5, and determines the precise rotational position of the rotating body 31 according to the output of the detection angle θp.

More specifically, the angle changing unit 11 converts the detection angle θp into a rotation angle θR of the rotating body 31 by using formula 5 below. The rotation angle detector 1 detects and outputs the rotation angle θR as the rotation angle θ of the rotating body 31.

$$\theta R = (360 * T + \theta p)/N \qquad \text{[Formula 5]}$$

The sine-wave generator 12 receives the detection angle θp from the angle setting unit 10, and receives initial phases φu and φv from the initial phase detector 5. The sine-wave generator 12 calculates the values of sin θp and cos θp according to the value of the detection angle θp, and transmits the obtained sin θp and cos θp to the detected-angle multiplier 7. Further, the sine-wave generator 12 calculates the values of sin 3(θp+φu) and sin 3(θ+φ) according to the values of the detection angle θp and the initial phases φu and φv, and outputs the obtained sin 3(θp+φu) and sin 3(θ+φ) to the pseudo three-dimensional harmonics generator 14.

Figure 8:
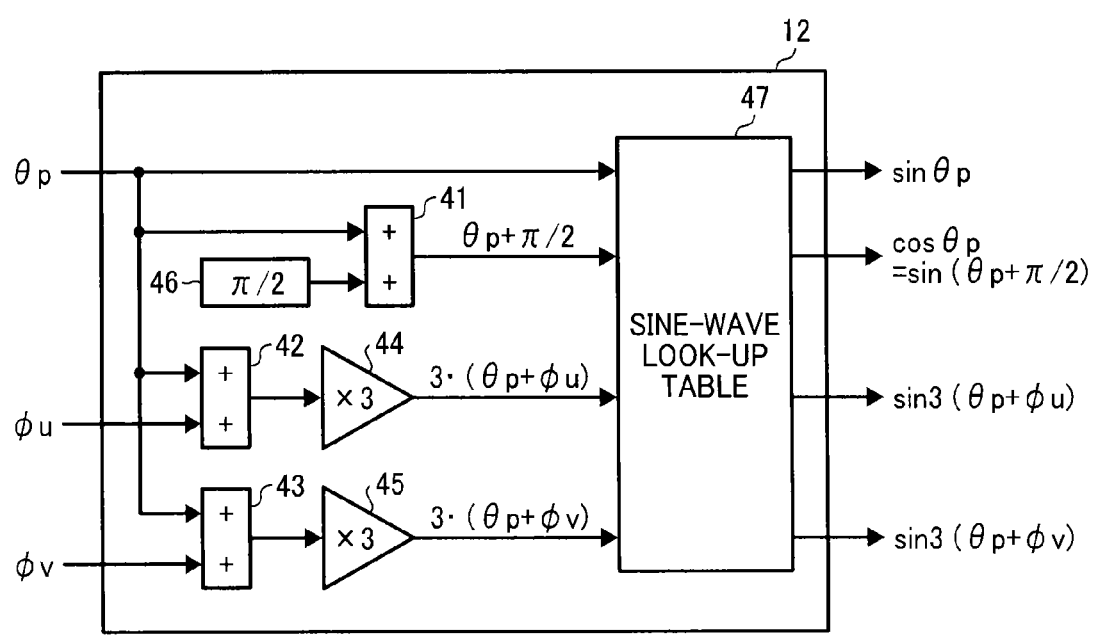
FIG. 8 is a block diagram of a sine-wave generator, according to an example embodiment of the present invention.

FIG. 8 is a block diagram of the sine-wave generator 12, according to the first embodiment. As illustrated in FIG. 8, the sine-wave generator 12 includes adders 41, 42, and 43, amplifiers 44 and 45, a memory 46, and a sine-wave look-up table 47. The adder 41 receives the detection angle θp from the angle setting unit 10, and receives angle π/2 from the memory 46. Further, the adder 41 adds the angle π/2 to the detection angle θp, and outputs the result (θp+π/2) to the sine-wave look-up table 47.

The adder 42 receives the detection angle θp and the initial phase φu, and calculates the sum of the detection angle θp and the initial phase φu. Then, the adder 42 transmits the calculation result (θp+φu) to the amplifier 44. The amplifier 44 multiplies the calculation result of the adder 42 by 3 (3·(θp+φu)), and outputs the result to the sine-wave look-up table 47.

The adder 43 receives the detection angle θp and the initial phase φv, and calculates the sum of the detection angle θp and the initial phase φv. Then, the adder 43 transmits the calculation result (θp+φv) to the amplifier 45. The amplifier 45 multiplies the calculation result of the adder 43 by 3 (3·(θp+φv)), and outputs the result to the sine-wave look-up table 47.

The sine-wave look-up table 47 receives calculation results (θp+π/2), (3·(θp+φu)), and (3·(θp+φv)) from the adder 41, and the amplifier 44, and the amplifier 45, respectively. Moreover, the sine-wave look-up table 47 receives the detection angle θp from angle setting unit 10. The sine-wave look-up table 47 refers to a look-up table registered in an internal memory according to the detection angle θp, (θp+π/2), (3(θp+φu)), and (3(θp+φv)), and outputs the values of sin θp, cos θp=sin (θp+π/2), sin 3(θp+φu), and sin 3(θp+φu).

The detected-angle multipliers 7, the adder/subtracter 8, the comparator 9, the angle setting unit 10, the angle changing unit 11, and the sine-wave generator 12 as a whole serve as an angle detection unit KT. The angle detection unit KT detects the rotation angle θ of the rotating body 31 according to two or more detection signals, and outputs a detection angle θp.

The three-dimensional harmonics amplitude calculator (pseudo harmonics amplitude generator) 13 receives as detection signals (orthogonalized signals) the corrected X-axis orthogonal signal X and the corrected Y-axis orthogonal signal Y from the X-amplitude corrector 6a and the Y-amplitude corrector 6b of the amplitude corrector 6, and calculates the amplitude of the three-dimensional harmonics included in the corrected X-axis orthogonal signal X and the corrected Y-axis orthogonal signal Y. Then, the three-dimensional harmonics amplitude calculator 13 transmits the calculated amplitude to the pseudo three-dimensional harmonics generator 14.

Figure 9:
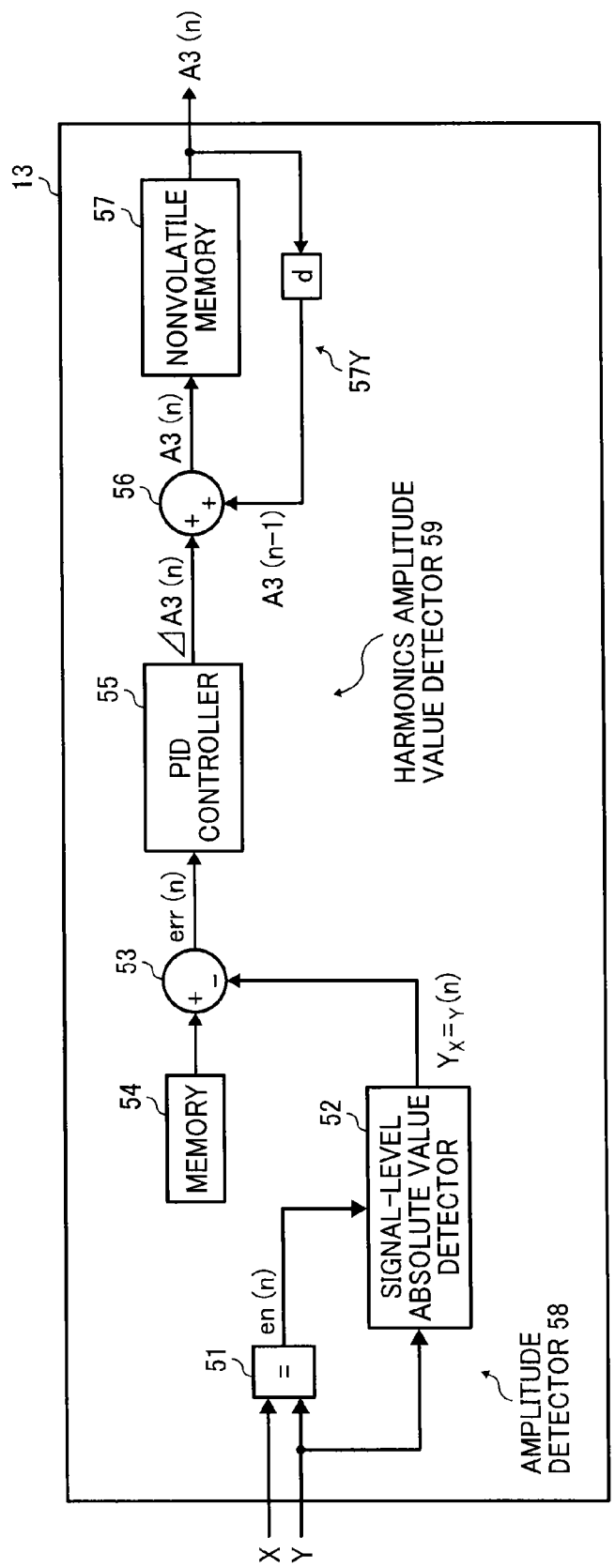
FIG. 9 is a block diagram of a three-dimensional harmonics amplitude calculator, according to an example embodiment of the present invention.

FIG. 9 is a block diagram of the three-dimensional harmonics amplitude calculator 13, according to the first embodiment. As illustrated in FIG. 9, the three-dimensional harmonics amplitude calculator 13 includes a signal-level matching detector 51, a signal-level absolute value detector 52, a subtracter 53, a memory 54, a proportional integral derivative (PID) controller 55, an adder 56, and a nonvolatile memory 57.

The signal-level matching detector 51 receives the corrected X-axis orthogonal signal X and the corrected Y-axis orthogonal signal Y, and when the signal levels of these signals match, the signal-level matching detector 51 transmits a signal en(n) to the signal-level absolute value detector 52.

In addition to the signal en(n), the signal-level absolute value detector 52 also receives the corrected Y-axis orthogonal signal Y. Once the signal en(n) is received, the signal-level absolute value detector 52 detects an absolute value $Y_{X=Y}(n)$ of the signal level of the corrected Y-axis orthogonal signal Y at that time, and transmits it to the subtracter 53. Note that the absolute value $Y_{X=Y}(n)$ of the signal level of the corrected Y-axis orthogonal signal Y is equal to the signal level of the corrected X-axis orthogonal signal X.

The signal-level matching detector 51 and the signal-level absolute value detector 52 serve as an amplitude detector 58.

In addition to the absolute value $Y_{X=Y}(n)$, the subtracter 53 also receives a specified desired value from the memory 54. The subtracter 53 subtracts the absolute value $Y_{X=Y}(n)$ from the desired value, and transmits a difference err(n) to the PID controller 55.

The PID controller 55 processes the difference err(n) in terms of deviation between an output value and a desired value (proportional), and its integral and differential. Then, the PID controller 55 transmits a three-dimensional harmonics amplitude correction value ΔA3(n) to the adder 56.

In addition to the three-dimensional harmonics amplitude correction value ΔA3(n), the adder 56 also receives the previous three-dimensional harmonics amplitude value A3(n−1) to which a desired value correction value KA3 multiplied by [desired value-$Y_{X=Y}$(n)] is added. As shown in formula 6 below, the adder 56 adds the three-dimensional harmonics amplitude correction value ΔA3(n) to the previously received value (A3(n−1)+KA3·(desired value-$Y_{X=Y}$(n))), and transmits it to the nonvolatile memory 57.

$$A3(n)=A3(n-1)+KA3 \cdot (\text{desired value}-Y_{X=Y}(n))+\Delta A3(n) \quad \text{[Formula 6]}$$

Here, KA3 has a positive value.

Figure 10:
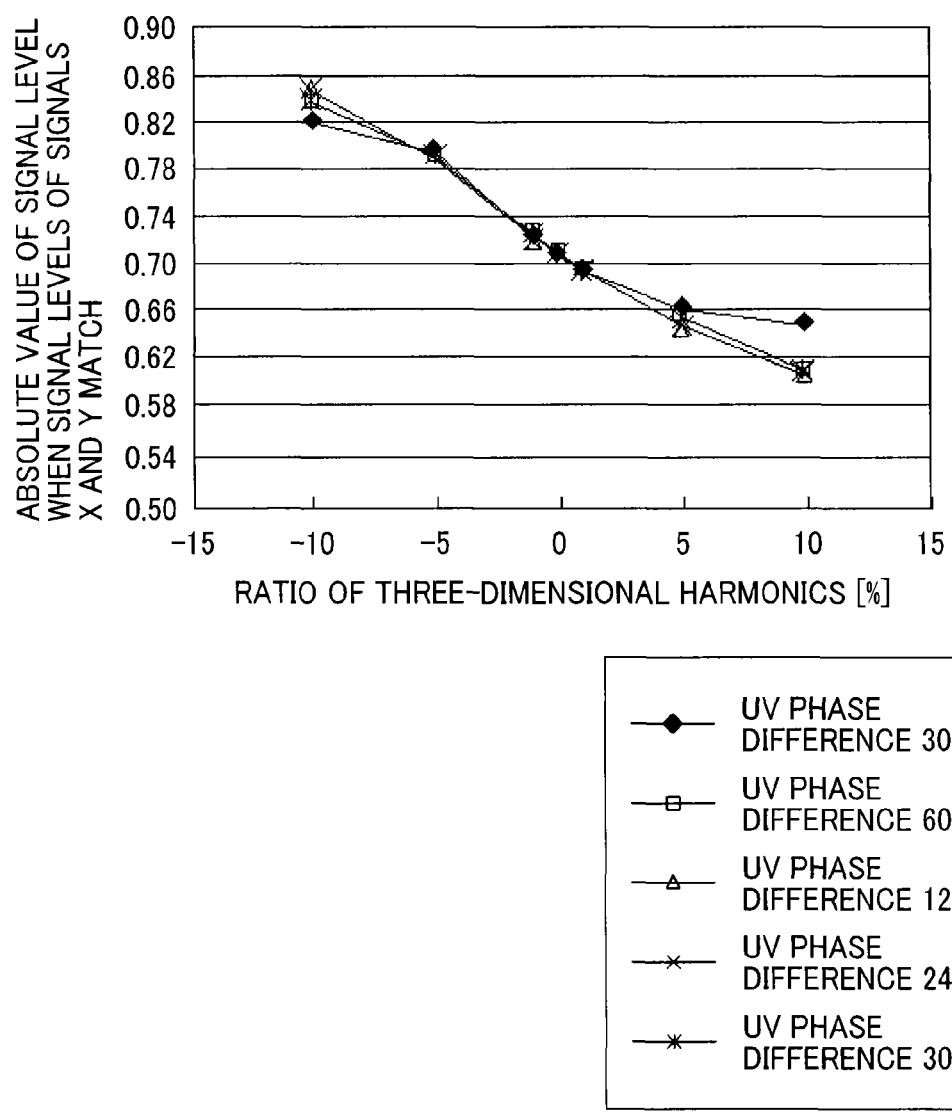
FIG. 10 depicts the relationship between the ratio of three-dimensional harmonics and the absolute value of a signal level when signal levels of signals X and Y match, for several phase differences among detection signals, according to an example embodiment of the present invention.

FIG. 10 depicts the relationship between the ratio of three-dimensional harmonics and the absolute value of a signal level when signal levels of signals X and Y match, for several phase differences among detection signals, according to the first embodiment. More specifically, FIG. 10 depicts the relationship between the ratio of the three-dimensional harmonics included in the U-phase detection signal and V-phase detection signal to the amplitude, and the absolute value of a signal level when signal levels of the corrected X-axis orthogonal signal X and the corrected Y-axis orthogonal signal Y match, for several phase differences (30°, 60°, 120°, 240°, 300°) among UV-phase detection signals. The amplitude of the corrected X-axis orthogonal signal X and the corrected Y-axis orthogonal signal Y is standardized by the amplitude corrector 6, for example, to "1" (Atgt=1). In this case, when the signal levels of the corrected X-axis orthogonal signal X and the corrected Y-axis orthogonal signal Y match, the absolute values of the signal levels monotonously decrease as the ratio of three-dimensional harmonics decreases. This can be seen in FIG. 10 where absolute values decrease for several phase differences. The above relationship is unchanged regardless of the value of the phase difference among signals of the U-phase detection signal and V-phase detection signal, and the absolute values of the signal levels are fixed when the ratio of three-dimensional harmonics is 0% and the signal levels match.

Accordingly, once the value 0.7071 (=1√2) when the ratio of three-dimensional harmonics of FIG. 10 is 0% is stored in the memory 54 as a desired value, the three-dimensional harmonics amplitude calculator 13 can easily and automatically calculate three-dimensional harmonics amplitude A3(n) by performing formula 6 a few times. Because the value of target amplitude Atgt may be any value other than "1", the three-dimensional harmonics amplitude calculator 13 can store any desired value in the memory 54 according to the value of target amplitude Atgt.

The subtracter 53, the memory 54 that stores a desired value, the PID controller 55, the adder 56, and the nonvolatile memory 57 serve as a harmonics amplitude value detector 59 that determines the harmonics amplitude value of the harmonics included in the detection signal according to the amplitude value of the detection signal.

In the first embodiment, the three-dimensional harmonics amplitude calculator 13 outputs a signal en when the corrected X-axis orthogonal signal X and the corrected Y-axis orthogonal signal Y match. However, the three-dimensional harmonics amplitude calculator 13 may output a signal en when the detection angle θp becomes equal to a phase $\theta_{X=Y}$ when the signal levels of the corrected X-axis orthogonal signal X and the corrected Y-axis orthogonal signal Y match.

When a rotation angle is detected by using sine-wave signal of two phases as the rotation angle detector 1 according to the first embodiment does, the detected angle where the signal levels match has a fixed value regardless of any error. For example, $\theta_{X=Y}$ indicates π/4 or π/4.

Accordingly, when a signal en(n) is output when the detection angle θp is π/4 or π/4, $Y_{X=Y}$(n) can be detected without detecting that the signal levels of the corrected X-axis orthogonal signal X and the corrected Y-axis orthogonal signal Y match.

The three-dimensional harmonics amplitude calculator 13 includes the readable/writable nonvolatile memory 57 subsequent to the adder 56, and updates the value of the three-dimensional harmonics amplitude A3(n) every time the value of the three-dimensional harmonics amplitude is updated. Accordingly, when the power of the three-dimensional harmonics amplitude calculator 13 is turned off and then turned on and three-dimensional harmonics amplitude calculation processes are to be started, the three-dimensional harmonics amplitude calculator 13 can use the previously-updated three-dimensional harmonics amplitude value A3(n) stored in the nonvolatile memory 57 as an initial value of the three-dimensional harmonics amplitude calculation processes. As a result, the three-dimensional harmonics amplitude calculator 13 can remove three-dimensional harmonics from the initial value of the three-dimensional harmonics amplitude calculation processes.

As seen from FIG. 10, when the amplitude values of the corrected X-axis orthogonal signal X and the corrected Y-axis orthogonal signal Y are known and the phase difference between the detection signals HU and HV is known, the three-dimensional harmonics amplitude value A3(n) can uniquely be determined. Accordingly, the three-dimensional harmonics amplitude calculator 13 may employ a large-capacity look-up table and an advanced calculator to uniquely determine the three-dimensional harmonics amplitude value A3(n) according to the amplitude value of the corrected X-axis orthogonal signal X and the corrected Y-axis orthogonal signal Y and the phase difference between the detection signals HU and HV.

In addition to the three-dimensional harmonics amplitude value A3(n) transmitted from the three-dimensional harmonics amplitude calculator 13, the pseudo three-dimensional harmonics generator 14 also receives the sine wave sin 3(θp+φu) and sin 3(θp+φv) from the sine-wave generator 12. The pseudo three-dimensional harmonics generator 14 generates pseudo three-dimensional harmonics and A3·sin 3(θp+φu) and A3·sin 3(θp+φv) from the received values.

The pseudo three-dimensional harmonics generator 14 includes multipliers 14a and 14b. The multiplier 14a receives the value of the three-dimensional harmonics amplitude A3(n) and the sine wave sin 3(θp+φu), and multiplies them to generate pseudo three-dimensional harmonics A3·sin 3(θp+φu). Then, the multiplier 14a transmits the resultant value to the subtracter 3a of the arithmetic unit 3. The multiplier 14b receives the value of the three-dimensional harmonics amplitude A3(n) and the sine wave sin 3(θp+φu), and multiplies them to generate pseudo three-dimensional harmonics A3·sin 3(θp+φv). Then, the multiplier 14b transmits the resultant value to the subtracter 3b of the arithmetic unit 3.

The rotation angle detector 1 also includes a controller that controls the entire operation and an operation panel. The controller includes, for example, a central processing unit (CPU), a read only memory (ROM), and a random access memory (RAM). In the ROM, the controller stores a basic program to serve as the rotation angle detector 1, and a rotation angle detection program that executes a rotation angle detection method according to at least one embodiment of the present invention. The controller controls the elements of the rotation angle detector 1 to perform basic processes of the rotation angle detector 1, and executes a rotation angle detection method according to at least one embodiment of the present invention, according to a program stored in the ROM. The operation panel includes various kinds of operation keys, and is used to specify the processes to be performed by the rotation angle detector 1. In particular, the operation panel is used to perform various setting processes in a rotation angle detection method according to at least one embodiment of the present invention.

The rotation angle detector 1 reads into a ROM or the like of the controller a rotation angle detection program recorded in a computer-readable recording medium such as a ROM, an electrically erasable and programmable read only memory (EEPROM), an electrically programmable read only memory (EPROM), a flash memory, a flexible disk, a compact disc read only memory (CD-ROM), a compact disc rewritable (CD-RW), a digital versatile disk (DVD), a secure digital (SD) card, and a magneto-optical disc (MO) to perform a rotation angle detection method according to at least one embodiment of the present invention. By so doing, a rotation angle detection method that precisely detects the rotation angle of a rotating body at low cost is achieved with a smaller number of rotation detecting units. The rotation detecting units are described later in detail. The rotation angle detection program is a computer-readable program written by legacy programming language or object-oriented programming language such as assembler language, C language, C++ language, C# language, and Java (registered trademark), and the program can be distributed upon being written on such a recording medium as above.

Next, advantageous effects of the first embodiment are described. The rotation angle detector 1 precisely detects the rotation angle of the rotating body 31 at low cost, with a smaller number of hall effect sensors (rotation detecting units) 20a and 20b.

In the rotation angle detector 1 according to the first embodiment, the U-phase hall effect sensor 20a and the V-phase hall effect sensor 20b that serve as magnetic detectors are arranged around a drive motor of an image processing apparatus to which the rotation angle detector 1 is applied, for example, around the rotating body 31 of the brushless DC motor 30, ideally with phase difference of $2\pi/3$ by electrical angle.

The rotation angle detector 1 detects the rotation angle $\theta$ of the rotating body 31, which is the rotation axis of the brushless DC motor 30.

The hall effect sensors 20a and 20b output the detected signals, as illustrated in FIG. 3, on which harmonics such as three-dimensional harmonics are superimposed due to uneven magnetization or the like of the rotating body 31. When three-dimensional harmonics are superimposed on the signals detected by the hall effect sensors 20a and 20b, the rotation angle detector 1 cannot precisely detect the rotation angle $\theta$ of the rotating body 31 according to the detection signals received from the hall effect sensors 20a and 20b.

Given these circumstances, the rotation angle detector 1 removes the effect caused by three-dimensional harmonics from the detection signals HU0 and HV0 in which detection signals HU+, HU−, HV+, and HV− of the hall effect sensors 20a and 20 are converted into single end signals by the differential amplifiers 21a and 21b, to precisely detect the rotation angle $\theta$ of the rotating body 31.

The rotation angle detector 1 uses the signal correctors 2a and 2b of the signal corrector 2 to correct the received detection signals HU0 and HV0 such that the signal amplitude match the target amplitude Atgt, and removes offset. The signal corrector 2 transmits to the arithmetic unit 3 the corrected detection signal HU1 and the corrected detection signal HV1 from which offset has been removed.

The arithmetic unit 3 uses the subtracters 3a and 3b to subtract the pseudo three-dimensional harmonics A3·sin 3($\theta$p+$\phi$u) and A3·sin 3($\theta$p+$\phi$v), which is the output of the pseudo three-dimensional harmonics generator 14, from the corrected detection signal HU1 and the corrected detection signal HV1, and removes three-dimensional harmonics from the corrected detection signal HU1 and the corrected detection signal HV1. The arithmetic unit 3 removes three-dimensional harmonics from the removed detection signal HU and the removed detection signal HV, and transmits the resultant signals to the orthogonalization unit 4 and the initial phase detector 5.

The orthogonalization unit 4 uses the summing amplifier 4a and the differential gain amplifier 4b to perform formula 1, and orthogonalizes the removed detection signal HU and the removed detection signal HV to generate the X-axis orthogonal signal X0 and the Y-axis orthogonal signal Y0. Then, the generate X-axis orthogonal signal and Y-axis orthogonal signal are output to the amplitude corrector 6.

The amplitude corrector 6 uses the X-amplitude corrector 6a and the Y-amplitude corrector 6b to multiply the X-axis orthogonal signal X0 and the Y-axis orthogonal signal Y0 by gain such that the amplitude of the X-axis orthogonal signal X0 and the Y-axis orthogonal signal Y0 matches a target amplitude Atgt. By so doing, a corrected X-axis orthogonal signal X and a corrected Y-axis orthogonal signal Y are generated. Then, the amplitude corrector 6 transmits the generated corrected X-axis orthogonal signal X and corrected Y-axis orthogonal signal Y to the detected-angle multiplier 7 and the three-dimensional harmonics amplitude calculator 13.

The detected-angle multiplier 7 multiplies the corrected X-axis orthogonal signal X and the corrected Y-axis orthogonal signal Y by the sine waves sin $\theta$p and cos $\theta$p in the detection angles $\theta$p specified according to the operation of the rotation angle detector 1, and transmits the resultant signals to the adder/subtracter 8. The sine waves sin $\theta$p and cos $\theta$p are input to the detected-angle multiplier 7 by the sine-wave generator 12.

The adder/subtracter 8 uses the subtracter 8a and the subtracter 8b to perform adding/subtracting processes of formulas 3 and 4 on the multiplication result received from the detected-angle multiplier 7, and generates rotation vectors X' and Y'. Then, the adder/subtracter 8 transmits the generated rotation vector Y' to the comparator 9.

Figure 11:
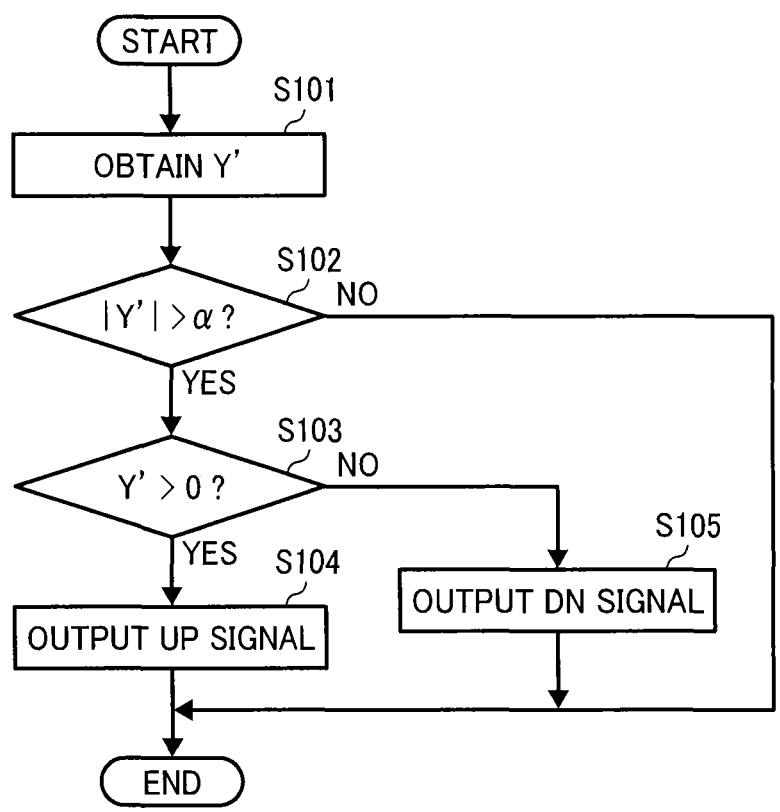
FIG. 11 is a flowchart illustrating the comparison processes performed by a comparator, according an example embodiment of the present invention.

FIG. 11 is a flowchart illustrating the comparison processes performed by the comparator 9, according the first embodiment. The comparator 9 determines whether or not the rotation vector Y' generated by the subtracter 8a of the adder/subtracter 8 is zero, and transmits to the angle setting unit 10 UP signal and DN signal for changing the set value of the detection angle $\theta$p according to the result of determination.

As illustrated in FIG. 11, the comparator 9 obtains the value of the rotation vector signal Y' from the subtracter 8a (step S101), and determines whether or not the absolute value of the rotation vector signal Y' is greater than a specified threshold $\alpha$ (step S102).

The threshold $\alpha$ is used to determine whether or not the value of the rotation vector signal Y' is zero. If whether the value of the rotation vector signal Y' is zero is strictly determined, even a very slight deviation leads to a change in the set value of the detection angle $\theta$p. Accordingly, it becomes necessary to change the set value of the detection angle θp frequently, and the value of the detection angle θp becomes unstable. For this reason, the comparator 9 assumes that the rotation vector signal Y' is zero when the deviation from zero is within the threshold α. Accordingly, the value of the detection angle θp becomes stable.

For example, the value of the threshold α is determined by formula 7 below according to the target amplitude Atgt and the unit-base rotation angle θstep.

$$\alpha = Atgt \cdot \sin(\theta step/2) * 1.0 - 1.1 \quad \text{[Formula 7]}$$

When it is determined in step S102 that the absolute value of the rotation vector signal Y' is equal to or less than α ("NO" in step S102), the comparator 9 determines that the current set value of the detection angle θp accurately represents the rotational position of the rotating body 31, and the process terminates.

When it is determined in step S102 that the absolute value of the rotation vector signal Y' is greater than α ("YES" in step S102), the comparator 9 determines whether the rotation vector signal Y' has a positive value or a negative value (step S103).

When it is determined in step S103 that the rotation vector signal Y' has a positive value ("YES" in step S103), the comparator 9 determines that the value of the detection angle θp is smaller than the rotation angle θ in the vector rotation illustrated in FIG. 7. Then, the comparator 9 outputs UP signal so as to increase the value of the detection angle θp, and terminates the comparison process (step S104).

When it is determined in step S103 that the rotation vector signal Y' has a negative value ("NO" in step S103), the comparator 9 determines that the value of the detection angle θp is greater than the rotation angle θ in the vector rotation illustrated in FIG. 7. Then, the comparator 9 outputs DN signal so as to decrease the value of the detection angle θp, and terminates the comparison process (step S105).

The comparator 9 transmits UP signal and DN signal to the angle setting unit 10 so as to increase and decrease the detection angle θp.

The comparator 9 repeats such comparison processes at high speed such that the set value of the detection angle θp always matches the phase θ of a detection signal.

The angle setting unit 10 refers to a unit-base rotation angle θstep, and determines a detection angle θp based on the UP signal and DN signal output from the comparator 9. Then, the angle setting unit 10 transmits the detection angle θp to the sine-wave generator 12 or other relevant elements. The angle setting unit 10 also transmits the detection angle θp and the cycle count signal T to the angle changing unit 11.

Figure 12:
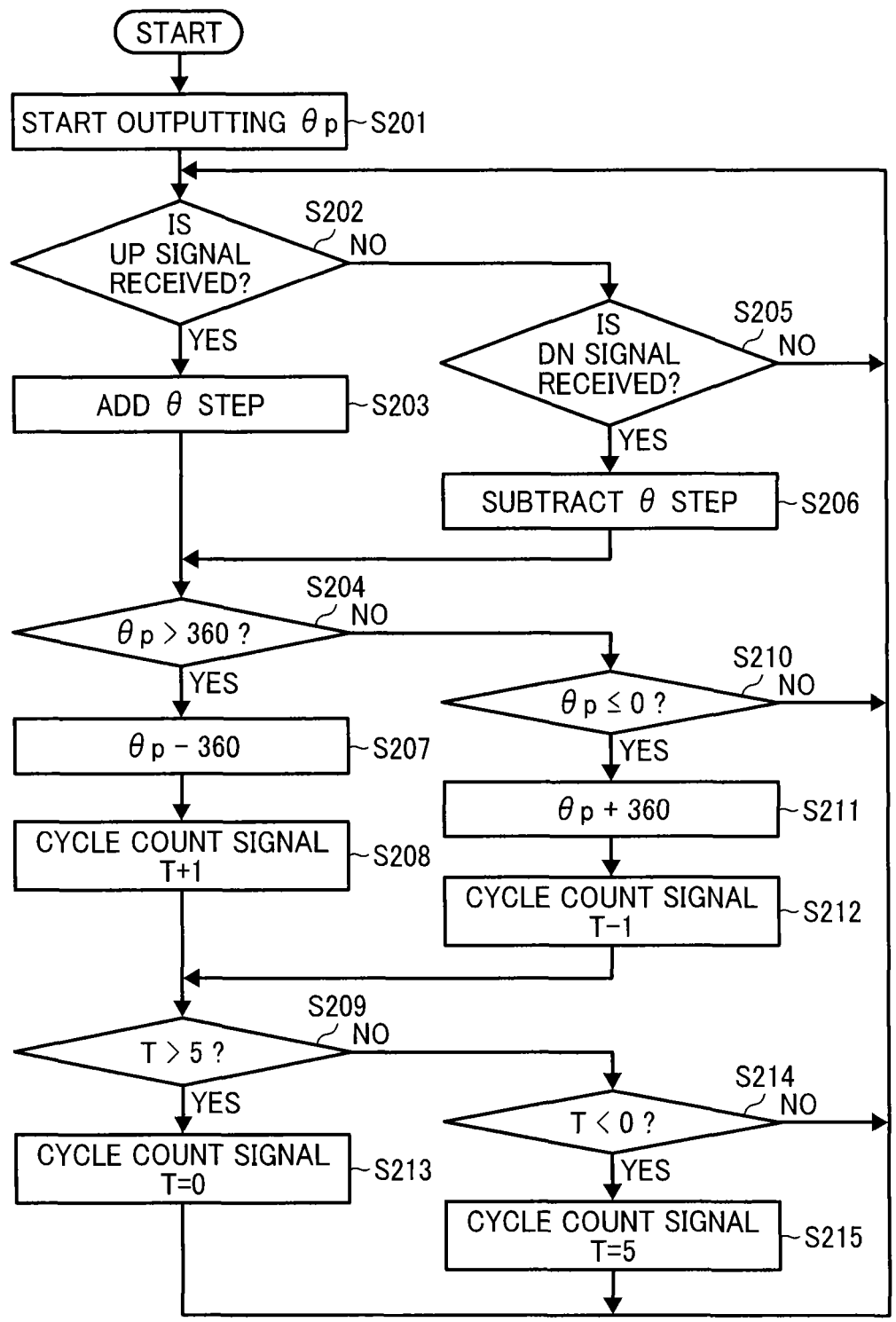
FIG. 12 is a flowchart illustrating the setting processes of a detection angle and a cycle count signal performed by an angle setting unit, according an example embodiment of the present invention.

FIG. 12 is a flowchart illustrating the setting processes of a detection angle and a cycle count signal performed by the angle setting unit 10, according the first embodiment. The angle setting unit 10 starts outputting detection angles θp where the unit-base rotation angle θstep is set to an initial value (step S201).

Then, the angle setting unit 10 checks whether or not the signal received from the comparator 9 is UP signal (step S202).

When it is determined in step S202 that the signal received from the comparator 9 is UP signal ("YES" in step S202), the angle setting unit 10 adds the angle of the unit-base rotation angle θstep to the set value of the current detection angle θp (step S203), and checks whether the detection angle θp exceeds 360° (step S204). At this stage, the angle setting unit 10 increases the to-be-output value of the detection angle θp by the value of the unit-base rotation angle θstep.

When it is determined in step 202 that the signal received from the comparator 9 is not UP signal ("NO" in step S202), the angle setting unit 10 checks whether the signal is DN signal (step S205).

When it is determined in step S205 that the signal received from the comparator 9 is DN signal ("YES" in step S205), the angle setting unit 10 subtracts the angle of the unit-base rotation angle θstep from the set value of the current detection angle θp (step S206), and checks whether the detection angle θp exceeds 360° (step S204). At this stage, the angle setting unit 10 decreases the to-be-output value of the detection angle θp by the value of the unit-base rotation angle θstep.

When it is determined in step S204 that the current detection angle θp exceeds 360° ("YES" in step S204), the angle setting unit 10 subtracts 360° from the set value of the current detection angle θp (step S207). Further, the angle setting unit 10 adds "1" to the cycle count signal T and outputs the resultant signal (step S208), and checks whether the cycle count signal T exceeds "5" (step S209).

When it is determined in step S204 that the current detection angle θp is equal to or less than 360° ("NO" in step S204), the angle setting unit 10 determines whether the set value of the current detection angle θp is equal to or less than 0° (step S210).

When it is determined in step S210 that the set value of the current detection angle θp is equal to or less than 0° ("YES" in step S210), the angle setting unit 10 adds 360° to the set value of the current detection angle θp (step S211). Further, the angle setting unit 10 subtracts "1" from the cycle count signal T and outputs the resultant signal (step S212), and checks whether the cycle count signal T exceeds "5" (step S209).

When it is determined in step S209 that the set value of the cycle count signal T exceeds "5" ("YES" in step S209), the angle setting unit 10 outputs the cycle count signal T as "0" (step S213). After the cycle count signal T is output, the angle setting unit 10 returns to step S202 and repeats the processes (steps S202 to S213).

When it is determined in step S209 that the set value of the cycle count signal T is less than "5" ("NO" in step S209), the angle setting unit 10 determines whether the set value of the cycle count signal T is less than "0" (step S214).

When it is determined in step S214 that the set value of the cycle count signal T is less than "0" ("YES" in step S214), the angle setting unit 10 outputs the cycle count signal T as "5" (step S215). After the cycle count signal T is output, the angle setting unit 10 returns to step S202 and repeats the processes (steps S202 to S215).

When it is determined in step S214 that the set value of the cycle count signal T is equal to or greater than "0" ("NO" in step S214), the angle setting unit 10 returns to step S202 without changing the set value of the cycle T, and repeats the processes (steps S202 to S215).

As described above, the angle setting unit 10 corrects the detection angle θp according to the outputs from the comparator 9 by repeating the setting processes, and outputs the resultant values.

The angle changing unit 11 uses formula 5 to convert the detection angle θp received from the angle setting unit 10 into a rotation angle θR of the rotating body 31 according to the cycle count signal T received from the angle setting unit 10. Then, the rotation angle θR is output. In other words, the angle changing unit 11 determines to which one of the six cycles of sine-wave detection signals the rotational position of the rotating body 31 corresponds, according to the cycle count signal T that iteratively counts 0 to 5, and determines the precise rotational position of the rotating body 31 according to the output of the detection angle θp.

The sine-wave generator 12 calculates the values of sin θp and cos θp according to the value of the detection angle θp received from the angle setting unit 10, and transmits the obtained sin θp and cos θp to the detected-angle multiplier 7. Further, the sine-wave generator 12 calculates the values of sin 3(θp+φu) and sin 3(θ+φ) according to the initial phases φu and φv received from the initial phase detector 5, and the sine-wave generator 12 outputs the obtained sin 3(θp+φu) and sin 3(θ+φ) to the pseudo three-dimensional harmonics generator 14.

The three-dimensional harmonics amplitude calculator 13 calculates the amplitude value A3(n) of the three-dimensional harmonics included in the corrected X-axis orthogonal signal X and the corrected Y-axis orthogonal signal Y received from the X-amplitude corrector 6a and the Y-amplitude corrector 6b of the amplitude corrector 6. Then, the three-dimensional harmonics amplitude calculator 13 transmits the calculated amplitude value A3(n) to the pseudo three-dimensional harmonics generator 14.

The pseudo three-dimensional harmonics generator 14 multiplies the three-dimensional harmonics amplitude A3(n) received from the three-dimensional harmonics amplitude calculator 13 by the sine waves sin 3(θp+φu) and sin 3(θp+φv) received from the sine-wave generator 12. As a result, pseudo three-dimensional harmonics A3·sin 3(θp+φu) and pseudo three-dimensional harmonics A3·sin 3(θp+φv) are generated. The pseudo three-dimensional harmonics generator 14 transmits the generated pseudo three-dimensional harmonics and A3·sin 3(θp+φu) and A3·sin 3(θp+φv) to the subtracters 3a and 3b of the arithmetic unit 3. The arithmetic unit 3 uses the subtracters 3a and 3b to subtract the pseudo three-dimensional harmonics A3·sin 3(θp+φu) and A3·sin 3(θp+φv) from the corrected detection signal HU1 and the corrected detection signal HV1, and removes three-dimensional harmonics from the corrected detection signal HU1 and the corrected detection signal HV1.

Accordingly, the rotation angle of the rotating body 31 can precisely be detected at low cost by using the hall effect sensors 20a and 20b as a rotation detecting unit to remove three-dimensional harmonics from the detection signals HU0 and HV0 received by the hall effect sensors 20a and 20b.

Figure 13:
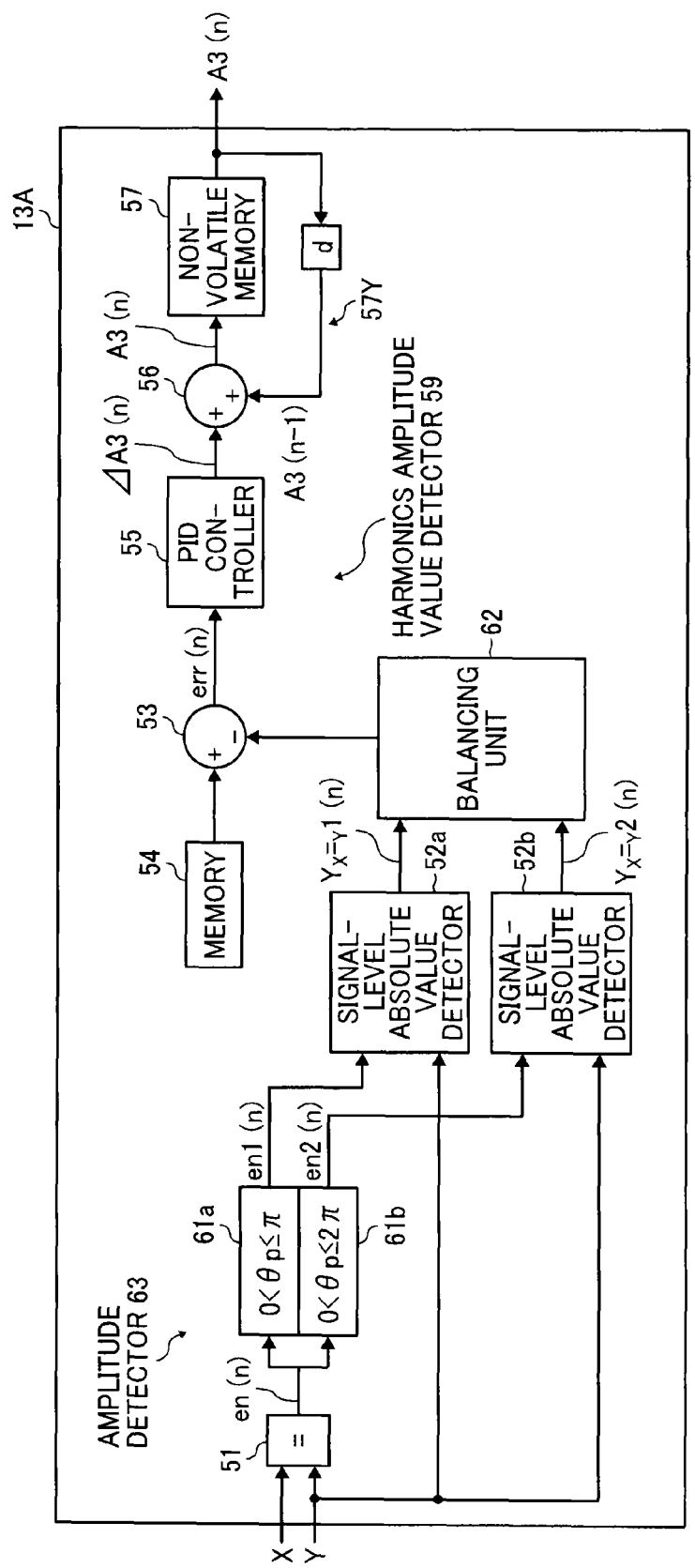
FIG. 13 is a block diagram of another three-dimensional harmonics amplitude calculator, according to an example embodiment of the present invention.

FIG. 13 is a block diagram of another three-dimensional harmonics amplitude calculator 13A, according to the first embodiment. The three-dimensional harmonics amplitude calculator 13 calculates the amplitude of three-dimensional harmonics based on the absolute value $Y_{X=Y}(n)$ of a signal level of the corrected Y-axis orthogonal signal Y when the signal levels of the corrected X-axis orthogonal signal X and the corrected Y-axis orthogonal signal Y match. Note that the absolute value $Y_{X=Y}(n)$ of a signal level of the corrected Y-axis orthogonal signal Y when the signal levels of the corrected X-axis orthogonal signal X and the corrected Y-axis orthogonal signal Y match is not limited to a single value, but may be, for example, an average of two signal levels as illustrated in FIG. 13.

In other words, there are two points at which the signal levels of the corrected X-axis orthogonal signal X and the corrected Y-axis orthogonal signal Y match, in one cycle of a detection signal. For this reason, as in the three-dimensional harmonics amplitude calculator 13A illustrated in FIG. 13, a three-dimensional harmonics amplitude value may be calculated by detecting the signal levels of these two points and calculating the average of these detected signal levels. Note that like reference signs denote like elements between FIG. 9 and FIG. 13 for the purpose of simplification.

As illustrated in FIG. 13, the three-dimensional harmonics amplitude calculator 13A includes the signal-level matching detector 51, detection angle assessment units 61a and 61b, two signal-level absolute value detectors 52a and 52b, a balancing unit 62, the subtracter 53, the memory 54, the PID controller 55, the adder 56, and the nonvolatile memory 57.

In the three-dimensional harmonics amplitude calculator 13A, when the signal levels of the received corrected X-axis orthogonal signal X and corrected Y-axis orthogonal signal Y match, the signal-level matching detector 51 transmits a signal en(n) to the detection angle assessment units 61a and 61b.

When the signal en(n) is received, the detection angle assessment unit 61a transmits a signal en1(n) to the signal-level absolute value detector 52a when the value of the detection angle θp meets 0<θp≤π. When the signal en(n) is received, the detection angle assessment unit 61b transmits a signal en2(n) to the signal-level absolute value detector 52b when the value of the detection angle θp meets π<θ≤2π.

Once the signal en1(n) is received, the signal-level absolute value detector 52a detects an absolute value $Y_{X=Y}1(n)$ of the signal level of the corrected Y-axis orthogonal signal Y at that time, and transmits it to the balancing unit 62.

Once the signal en2(n) is received, the signal-level absolute value detector 52b detects an absolute value $Y_{X=Y}2(n)$ of the signal level of the corrected Y-axis orthogonal signal Y at that time, and transmits it to the balancing unit 62.

When the absolute values $Y_{X=Y}1(n)$ and $Y_{X=Y}2(n)$ are received, the balancing unit 62 calculates the average of these two values, and transmits it to the subtracter 53 as an absolute value $Y_{X=Y}(n)$.

The signal-level matching detector 51, the detection angle assessment units 61a and 61b, the signal-level absolute value detectors 52a and 52b, and the balancing unit 62 serve as an amplitude detector 63. The amplitude detector 63 detects the amplitude or average of either of the corrected X-axis orthogonal signal X or the corrected Y-axis orthogonal signal Y as the amplitude of a detected signal, at the timing when the phase where the amplitude of the two orthogonalized signals of the corrected X-axis orthogonal signal X and the corrected Y-axis orthogonal signal Y match and the detection angle θp match.

The three-dimensional harmonics amplitude calculator 13A performs the following processes to calculate three-dimensional harmonics amplitude A3(n) in a similar manner to the processes of FIG. 9, and transmits the calculated three-dimensional harmonics amplitude value A3(n) to the pseudo three-dimensional harmonics generator 14.

By so doing, an error can be reduced in the detection of the signal levels of the corrected X-axis orthogonal signal X and the corrected Y-axis orthogonal signal Y even when there is offset in the corrected X-axis orthogonal signal X and the corrected Y-axis orthogonal signal Y. Accordingly, the three-dimensional harmonics amplitude A3(n) can be calculated more precisely.

The rotation angle detector 1 according to the first embodiment uses the detected-angle multiplier 7 and the subsequent elements to determine detection angle θp that corresponds to the rotational position of the rotating body 31, with reference to the rotation of vector illustrated in FIG. 7. Accordingly, the functions of elements can be simplified in the rotation angle detector 1, and the clock frequency or the scale of the circuit may be reduced.

As described above, the rotation angle detector 1 according to the first embodiment includes the hall effect sensors (rotation detecting units) 20a and 20b, the angle detection unit KT, the pseudo three-dimensional harmonics generator 14, and the arithmetic unit (harmonics removal unit) 3. The hall effect sensors 20a and 20b output two or more detected signals that vary depending on the rotation angle θ of the rotating body 31, where the phases of the detected signals are different from each other. The angle detection unit KT detects the rotation angle θ of the rotating body 31 based on the two or more detected signals, and outputs the detected rotation angle θ as a detection angle θp. The pseudo three-dimensional harmonics generator 14 generates pseudo three-dimensional harmonics (pseudo harmonics) based on the detection angle θp that is multiplied by a specified number. The arithmetic unit 3 removes harmonics from the detection signal by subtracting the pseudo three-dimensional harmonics from the detection signal, and transmits the obtained signal to the angle detection unit KT.

Accordingly, pseudo three-dimensional harmonics that are equivalent to the three-dimensional harmonics superimposed on the detection signal can be generated based on the detection angles θp that are detected by at least two hall effect sensors including the hall effect sensors 20a and 20b, and then three-dimensional harmonics can be removed from the detection signal. As a result, the rotation angle of the rotating body 31 can precisely be detected at low cost by using at least two hall effect sensors including the hall effect sensors 20a and 20b to remove three-dimensional harmonics.

The rotation angle detector 1 according to the first embodiment executes a rotation angle detection method including an angle detection step, a pseudo three-dimensional harmonics generation step, and a harmonics removal step. In the angle detection step, the rotation angle θ of the rotating body 31 is detected based on two or more signals detected by the hall effect sensors (rotation detecting units) 20a and 20b, where the detected signals vary depending on the rotation angle θ of the rotating body 31 and the phases of the detected signals are different from each other. In the pseudo three-dimensional harmonics generation step, the rotation angle θ of the rotating body 31 is generated based on the detection angle θp that is multiplied by a specified number. In the harmonics removal step, harmonics are removed from the detection signal by subtracting the pseudo three-dimensional harmonics from the detection signal, and the obtained signal is transmitted to the angle detection method.

Accordingly, pseudo three-dimensional harmonics that are equivalent to the three-dimensional harmonics superimposed on the detection signal can be generated based on the detection angles θp that are detected by at least two hall effect sensors including the hall effect sensors 20a and 20b, and then three-dimensional harmonics can be removed from the detection signal. As a result, the rotation angle of the rotating body 31 can precisely be detected at low cost by using at least two hall effect sensors including the hall effect sensors 20a and 20b to remove three-dimensional harmonics.

The rotation angle detector 1 according to the first embodiment includes the three-dimensional harmonics amplitude calculator (pseudo three-dimensional harmonics generator) 13. The three-dimensional harmonics amplitude calculator 13 includes the amplitude detectors 58 and 63 that detect the amplitude of a desired detection signal at a desired timing, and the harmonics amplitude value detector 59 that determines the harmonics amplitude value of the harmonics included in the detection signal. The pseudo three-dimensional harmonics generator 14 generates the pseudo three-dimensional harmonics (pseudo harmonics) of the amplitude that corresponds to the harmonics amplitude value.

Accordingly, even when the amplitude of the harmonics superimposed on the detection signal is unknown, pseudo three-dimensional harmonics that are equivalent to the three-dimensional harmonics superimposed on the detection signal can be generated to remove three-dimensional harmonics from the detection signal. As a result, the rotation angle of the rotating body 31 can precisely be detected at low cost by using at least two hall effect sensors including the hall effect sensors 20a and 20b to remove three-dimensional harmonics.

In the rotation angle detector 1 according to the first embodiment, the amplitude detector 58 detects the amplitude of one of the two detection signals at the timing when the amplitude values of the two detection signals match.

Accordingly, even when the amplitude of the harmonics superimposed on the detection signal is unknown, the amplitude of a detection signal in a specified phase can be detected. Moreover, pseudo three-dimensional harmonics that are equivalent to the three-dimensional harmonics superimposed on the detection signal can be generated to remove three-dimensional harmonics from the detection signal. As a result, the rotation angle of the rotating body 31 can precisely be detected at low cost by using at least two hall effect sensors including the hall effect sensors 20a and 20b to remove three-dimensional harmonics.

The rotation angle detector 1 according to the first embodiment includes the orthogonalization unit 4 and the amplitude corrector 6. The orthogonalization unit 4 calculates and outputs the X-axis orthogonal signal X0 and the Y-axis orthogonal signal Y0 (orthogonalized signals) based on the detection signals received from the arithmetic unit 3, which is the harmonics removal unit. The amplitude corrector 6 corrects the two orthogonalized signals so as to match a specified target amplitude. The amplitude detector 58 detects the amplitude of one of the two detection signals at the timing when the amplitude values of the two detection signals match.

Accordingly, the amplitude of a detection level at a specific phase can be detected even when a phase difference between the amplitude of the harmonics superimposed on the detection signal and the detection signal is unknown or even when there is no phase difference in the detection signal. As a result, pseudo three-dimensional harmonics that are equivalent to the three-dimensional harmonics superimposed on the detection signal can be generated to remove three-dimensional harmonics from the detection signal. Moreover, the rotation angle of the rotating body 31 can precisely be detected at low cost by using at least two hall effect sensors including the hall effect sensors 20a and 20b to remove three-dimensional harmonics.

The rotation angle detector 1 according to the first embodiment includes the orthogonalization unit 4 and the amplitude corrector 6. The orthogonalization unit 4 calculates and outputs the orthogonalized signals (the X-axis orthogonal signal X0 and the Y-axis orthogonal signal Y0) based on the removed detection signals (detection signals) received from the arithmetic unit (harmonics removal unit) 3. The amplitude corrector 6 corrects the two orthogonal signals so as to match a specified target amplitude. The amplitude detector 58 detects the amplitude of one of the two detection signals, at the timing when the phase where the amplitude of the two orthogonal signals match and the detection angle θp match.

Accordingly, the amplitude of a detection level at a specific phase can be detected more easily even when a phase difference between the amplitude of the harmonics superimposed on the detection signal and the detection signal is unknown or even when there is no phase difference in the detection signal. As a result, pseudo three-dimensional harmonics that are equivalent to the three-dimensional harmonics superimposed on the detection signal can be generated to remove three-dimensional harmonics from the detection signal. Accordingly, the rotation angle of the rotating body 31 can precisely be detected at low cost by using at least two hall effect sensors including the hall effect sensors 20a and 20b to remove three-dimensional harmonics.

The rotation angle detector 1 according to the first embodiment further includes the amplitude corrector (amplitude adjusting unit) 6. The amplitude corrector 6 corrects the amplitude of the detection signal, which is output from the arithmetic unit 3 that serves as the harmonics removal unit, so as to match a specified target amplitude, and outputs a harmonics removal detecting signal (the corrected X-axis orthogonal signal X and the corrected Y-axis orthogonal signal Y). The amplitude detector 58 detects the amplitude of one of the two harmonics removal detecting signals at the timing when the amplitude values of the two harmonics removal detecting signals match. The harmonics amplitude value detector 59 performs PID control on a difference among the amplitude detected by the amplitude detector 58, a phase difference in the detection signal, and target detection-signal amplitude of the detection signal that corresponds to the target amplitude.

Accordingly, harmonics amplitude can easily be obtained by PID control. Further, pseudo three-dimensional harmonics that are equivalent to the three-dimensional harmonics superimposed on the detection signal can be generated to remove three-dimensional harmonics from the detection signal. As a result, the rotation angle of the rotating body 31 can precisely be detected at low cost by using at least two hall effect sensors including the hall effect sensors 20a and 20b to remove three-dimensional harmonics.

In the rotation angle detector 1 according to the first embodiment, the harmonics amplitude value detector 59 performs PID control on a difference between the amplitude detected by the amplitude detector 58 and target detection-signal amplitude of the detection signal that corresponds to the target amplitude.

Accordingly, a harmonics amplitude value can be determined easily by performing PID control even when the amplitude of harmonics is unknown or a phase difference in the detection signal is unknown. As a result, the rotation angle of the rotating body 31 can precisely be detected at low cost by using at least two hall effect sensors including the hall effect sensors 20a and 20b to remove three-dimensional harmonics.

In the rotation angle detector 1 according to the first embodiment, the harmonics amplitude value detector 59 determines the harmonics amplitude value by performing PID control on a difference, in one cycle of the detection angle, between the average absolute value of the amplitude value of the two orthogonalized signals detected by the amplitude detector 58 and the target amplitude.

Accordingly, a harmonics amplitude value can be determined easily by performing PID control even when there is offset in the detection signal. As a result, the rotation angle of the rotating body 31 can precisely be detected at low cost by using at least two hall effect sensors including the hall effect sensors 20a and 20b to remove three-dimensional harmonics.

Embodiment 2

Figure 14A:
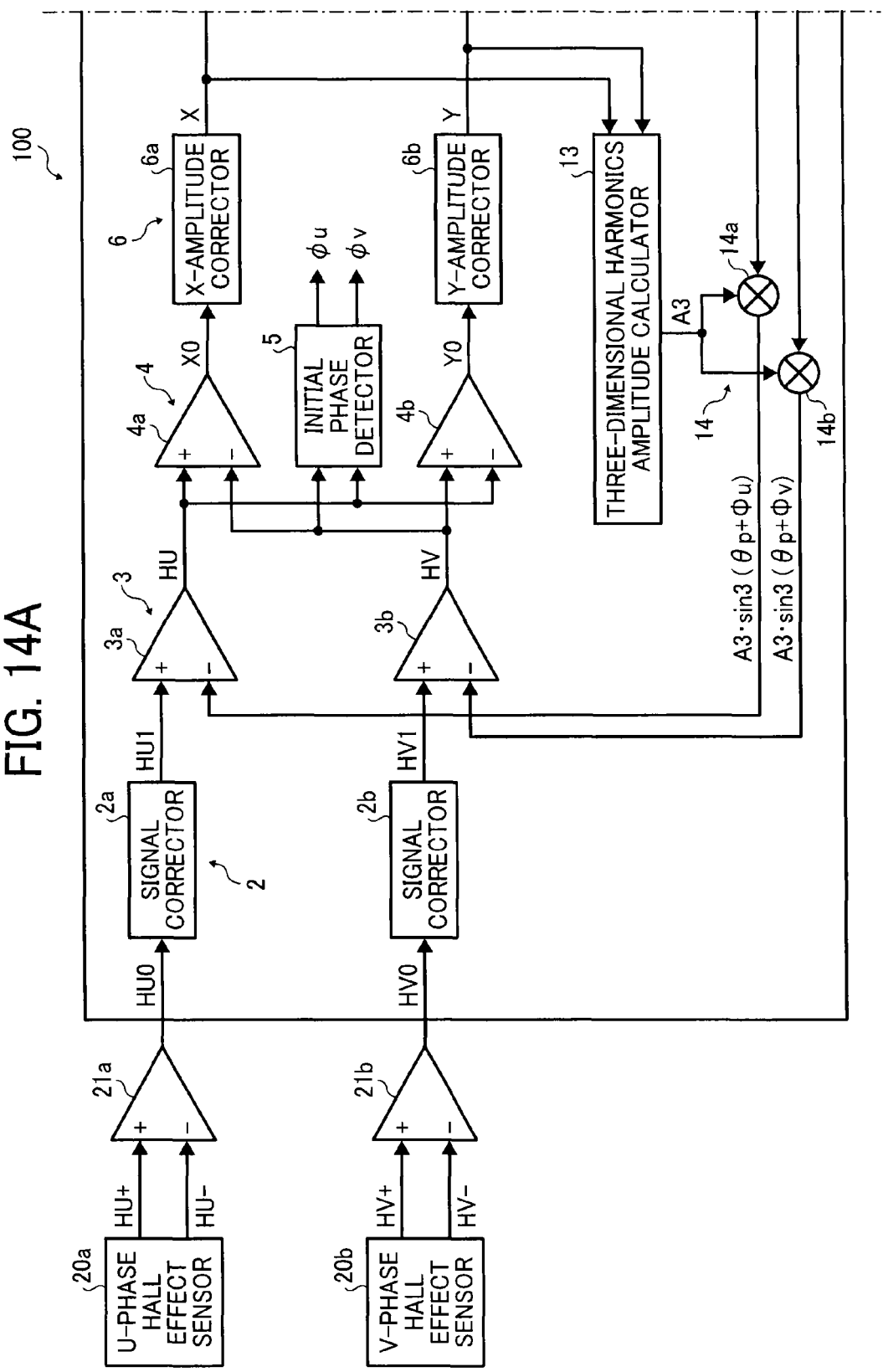
FIGS. 14A and 14B are a circuit diagram of a rotation angle detector to which the second embodiment of the present invention is applied, according to an example embodiment of the present invention.
Figure 14B:
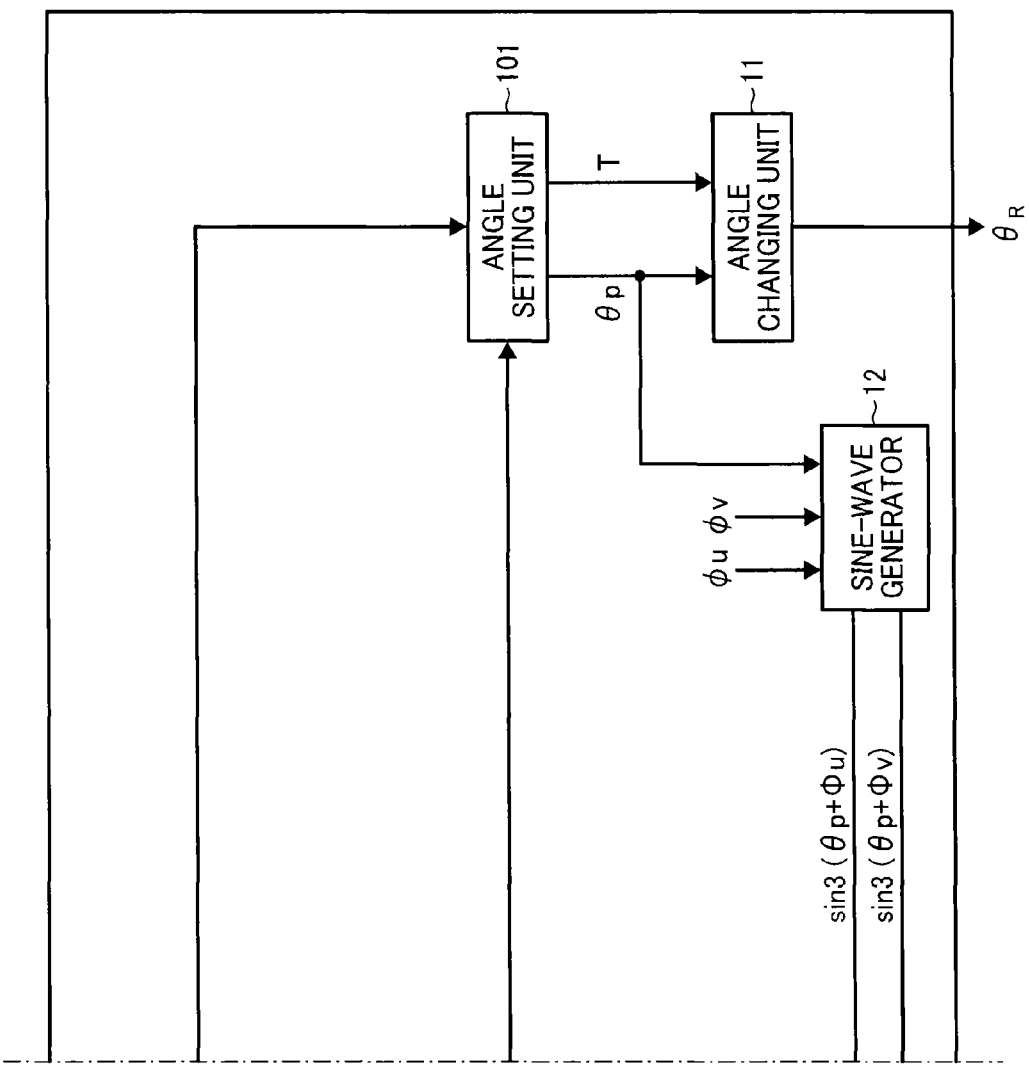

FIGS. 14A and 14B are a circuit diagram of a rotation angle detector 100 to which a rotation angle detector, a rotation angle detecting method, and an image forming apparatus according to the second embodiment of the present invention are applied.

Note that the rotation angle detector 100 is a modification of the rotation angle detector 1 according to the first embodiment, and like reference signs denote like elements between FIGS. 1A and 1B and FIGS. 14A and 14B for the purpose of simplification.

The rotation angle detector 100 according to the second embodiment determines detection angle θp that corresponds to the rotational position of the rotating body 31, with reference to the corrected X-axis orthogonal signal X and the corrected Y-axis orthogonal signal Y As illustrated in FIGS. 14A and 14B, the rotation angle detector 100 includes the signal correctors 2, the arithmetic units 3, the orthogonalization units 4, the initial phase detector 5, the amplitude correctors 6, the angle changing unit 11, the sine-wave generator 12, the three-dimensional harmonics amplitude calculator 13, and the pseudo three-dimensional harmonics generator 14, which are similar to those of the rotation angle detector 1 according to first embodiment, and includes an angle setting unit 101. Note that the rotation angle detector 100 does not include the detected-angle multiplier 7, the adder/subtracter 8, and the comparator 9 that the rotation angle detector 1 according to first embodiment includes. The rotation angle detector 100 receives rotation detection signals HU0 and HV0 output from the U-phase hall effect sensor 20a and the V-phase hall effect sensor 20b, respectively, through the differential amplifiers 21a and 21b, respectively.

Then, the X-amplitude corrector 6a of the amplitude corrector 6 transmits the corrected X-axis orthogonal signal X to the three-dimensional harmonics amplitude calculator 13, and transmits the same to the angle setting unit 101 directly. In a similar manner, the Y-amplitude corrector 6b of the amplitude corrector 6 transmits the corrected Y-axis orthogonal signal Y to the three-dimensional harmonics amplitude calculator 13, and transmits the same to the angle setting unit 101 directly.

Then, the angle setting unit 101 calculates arc tangent (arctan) of the corrected X-axis orthogonal signal X and the corrected Y-axis orthogonal signal Y, which are received from the X-amplitude corrector 6a and the Y-amplitude corrector, respectively, as in formula 8 to determine a detection angle θp.

$$\theta p = \tan^{-1}(Y/X) \quad \text{[Formula 8]}$$

In a similar manner to the angle setting unit 10 according to first embodiment, the angle setting unit 101 outputs a cycle count signal T when the value of the determined detection angle θp goes beyond 360° and returns to 0°.

If it is desired that formula 8 be performed in real time as the rotating body 31 rotates, the angle setting unit 101 should perform processes by using high-frequency clocks.

By so doing, three-dimensional harmonics can be removed from a detection signal even more simply and inexpensively.

Embodiment 3

Figure 15A:
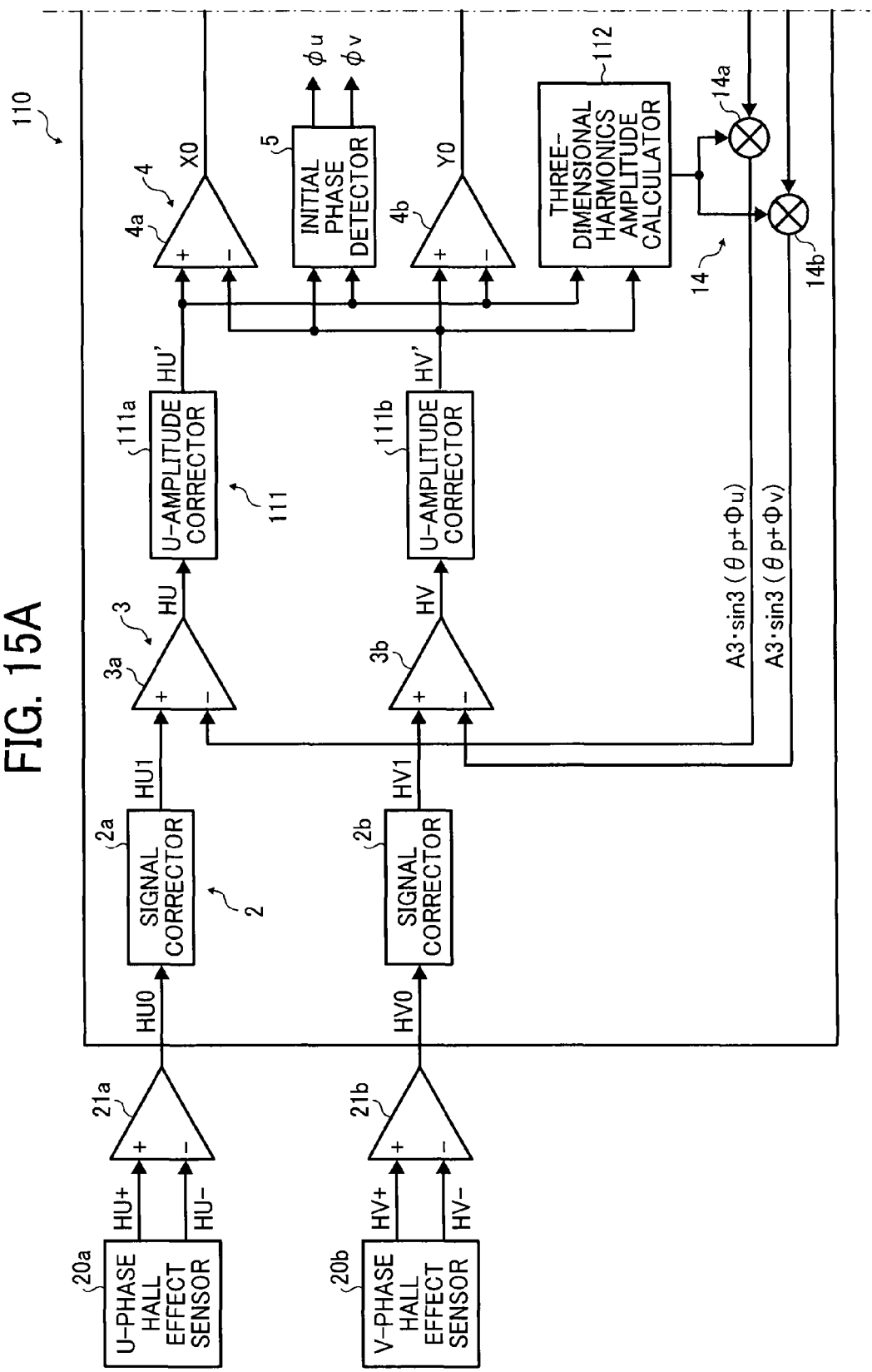
FIGS. 15A and 15B are a circuit diagram of a rotation angle detector to which the third embodiment of the present invention is applied.
Figure 15B:
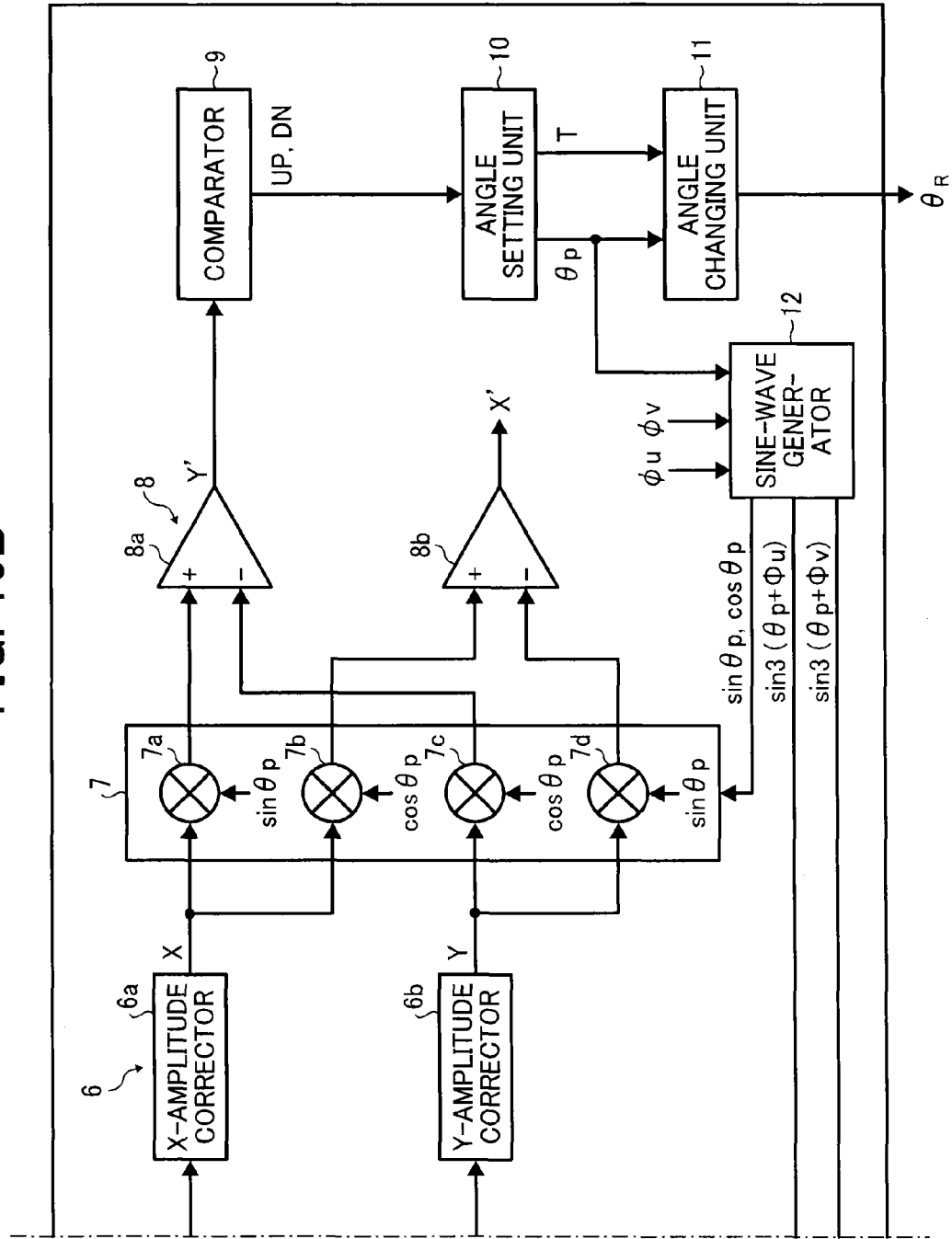

FIGS. 15A and 15B and FIG. 16 illustrate a rotation angle detector, a rotation angle detecting method, and an image forming apparatus, according to the third embodiment of the present invention. FIGS. 15A and 15B are a circuit diagram of a rotation angle detector 110 to which the rotation angle detector, the rotation angle detecting method, and the image forming apparatus according to the third embodiment of the present invention are applied.

Note that the rotation angle detector 110 is a modification of the rotation angle detector 1 according to the first embodiment, and like reference signs denote like elements between FIGS. 1A and 1B and FIGS. 15A and 15B for the purpose of simplification.

The rotation angle detector 110 according to the third embodiment is applied to cases in which the phase difference between the rotation detection signals HU0 and HV0 received from the hall effect sensors 20a and 20b are known, i.e., cases in which the attached angles of the hall effect sensors 20a and 20b are precisely known.

As illustrated in FIGS. 15A and 15B, the rotation angle detector 110 includes the signal correctors 2, the arithmetic units 3, the orthogonalization units 4, the initial phase detector 5, the amplitude correctors 6, the detected-angle multiplier 7, the adder/subtracter 8, the comparator 9, the angle setting unit 10, the angle changing unit 11, and the sine-wave generator 12, and the pseudo three-dimensional harmonics generator 14, which are similar to those of the rotation angle detector 1 according to first embodiment, and further includes an amplitude corrector 111 and a three-dimensional harmonics amplitude calculator 112.

The rotation angle detector 110 receives rotation detection signals HU0 and HV0 output from the U-phase hall effect sensor 20a and a V-phase hall effect sensor 20b, respectively, through the differential amplifiers 21a and 21b, respectively.

The amplitude corrector 111 includes a U-phase amplitude corrector 111a and a V-phase amplitude corrector 111b. The amplitude corrector 111 uses the arithmetic unit 3 to remove three-dimensional harmonics from the corrected detection signal HU1 and the corrected detection signal HV1, and corrects the amplitude of the removed detection signal HU and the removed detection signal HV, whose amplitude has been varied from the target amplitude Atgt, to match the target amplitude Atgt again.

The U-phase amplitude corrector 111a receives the removed detection signal HU from the subtracter 3a. The U-phase amplitude corrector 111a uses the subtracter 3a to remove three-dimensional harmonics from the corrected detection signal HU1 by subtracting pseudo three-dimensional harmonics A3·sin 3(θp+φu) from the corrected detection signal HU1, and corrects the amplitude of the removed detection signal HU, whose amplitude has been varied from the target amplitude Atgt, to match the target amplitude Atgt again. The U-phase amplitude corrector 111a transmits the amplitude-corrected corrected detection signal HU' to the orthogonalization unit 4, the initial phase detector 5, and the three-dimensional harmonics amplitude calculator 112.

The V-phase amplitude corrector 111b receives the removed detection signal HV from the subtracter 3b. The V-phase amplitude corrector 111b uses the subtracter 3b to remove three-dimensional harmonics from the corrected detection signal HV1 by subtracting pseudo three-dimensional harmonics A3 sin 3·(θp+φv) from the corrected detection signal HV1, and corrects the amplitude of the removed detection signal HV, whose amplitude has been varied from the target amplitude Atgt, to match the target amplitude Atgt again. The V-phase amplitude corrector 111b transmits the amplitude-corrected corrected detection signal HV' to the orthogonalization unit 4, the initial phase detector 5, and the three-dimensional harmonics amplitude calculator 112.

FIG. 16 depicts the relationship between the ratio of three-dimensional harmonics and the absolute value of a signal level when signal levels of the corrected detection signals HU' and HV' match, for several phase differences (30°, 60°, 120°, 240°, 300°) between a U-phase detection signal and a V-phase detection signal. As seen from FIG. 16, the signal level when the ratio of three-dimensional harmonics is 0% and the signal levels match varies, as a phase difference φuv between the U-phase detection signal and the V-phase detection signal varies. The signal level when the ratio of three-dimensional harmonics is 0% and the signal levels match is determined by a function where the phase difference φuv is a variable. Accordingly, the ratio of three-dimensional harmonics increases, and the signal level when the ratio of three-dimensional harmonics is 0% and the signal levels match monotonically increases.

Note that the three-dimensional harmonics amplitude calculator 112 is equivalent to the three-dimensional harmonics amplitude calculator 13 illustrated in FIG. 9. The three-dimensional harmonics amplitude calculator 112 receives the corrected detection signals HU' and HV', and sets a desired value Atgt to the signal level when the three-dimensional harmonics is 0% and the signal levels of the corrected detection signals HU' and HV' match with reference to the phase difference φuv and the amplitude of the corrected detection signals HU' and HV'. By so doing, the three-dimensional harmonics amplitude calculator 112 can easily calculate a three-dimensional harmonics amplitude value A3(n) by performing the formula 6 as above. Note that KA3 has a negative value therein.

As seen from FIG. 10, when the amplitude values of the corrected detection signals HU' and HV' and the phase difference φuv are known, the three-dimensional harmonics amplitude value A3(n) can uniquely be determined. Accordingly, the three-dimensional harmonics amplitude calculator 112 may employ a large-capacity look-up table and an advanced calculator to uniquely determine the three-dimensional harmonics amplitude value A3(n) according to the amplitude of the corrected detection signals HU' and HV' and the phase difference φuv.

By so doing, three-dimensional harmonics can be removed from a detection signal even more simply and inexpensively.

Embodiment 4

Figure 17A:
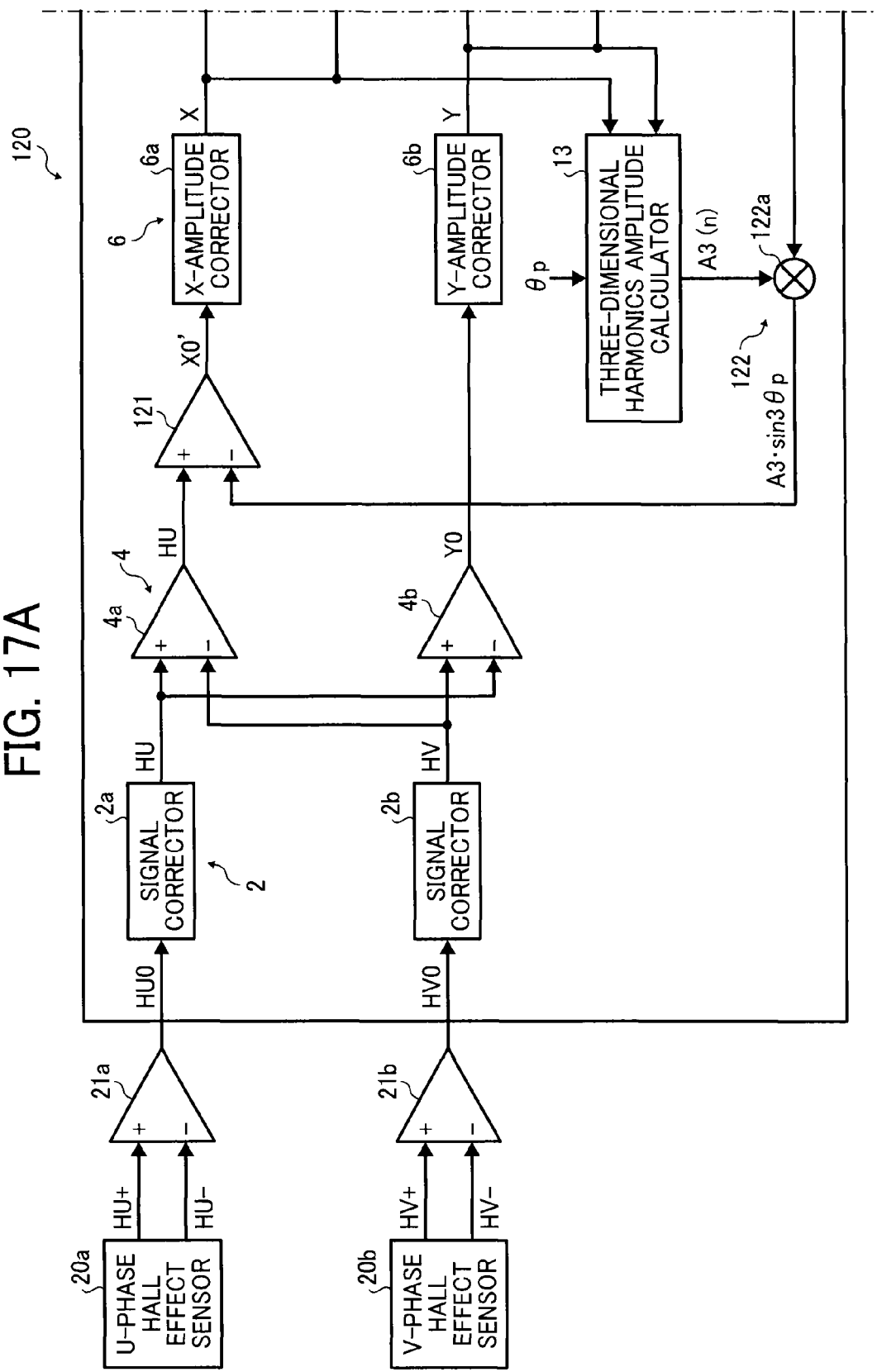
FIGS. 17A and 17B are a circuit diagram of a rotation angle detector to which the fourth embodiment of the present invention is applied, according to an example embodiment of the present invention.
Figure 17B:
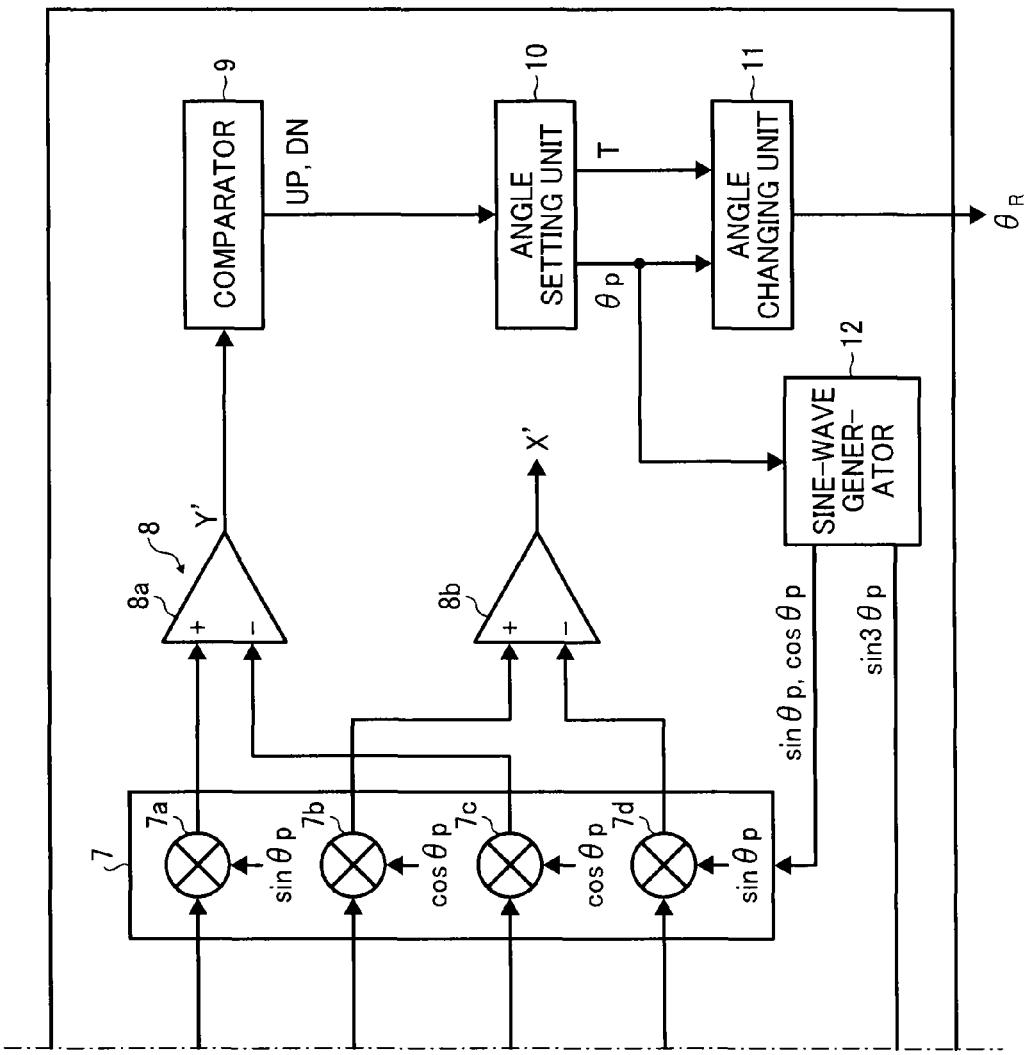

FIGS. 17A and 17B are a circuit diagram of a rotation angle detector 120 to which the rotation angle detector, the rotation angle detecting method, and the image forming apparatus according to the fourth embodiment of the present invention are applied.

Note that the rotation angle detector 120 is a modification of the rotation angle detector 1 according to the first embodiment, and like reference signs denote like elements between FIGS. 1A and 1B and FIGS. 17A and 17B for the purpose of simplification.

In the rotation angle detector 120 according to the fourth embodiment, the hall effect sensors 20a and 20b are arranged to have a phase difference of 120 degrees like hall effect sensors that are originally provided for the brushless DC motor 30 to detect commutation timing.

As illustrated in FIGS. 17A and 17B, the rotation angle detector 120 includes the signal correctors 2, the orthogonalization units 4, the amplitude correctors 6, the detected-angle multiplier 7, the adder/subtracter 8, the comparator 9, the angle setting unit 10, the angle changing unit 11, and the sine-wave generator 12, and the three-dimensional harmonics amplitude calculator 13, which are similar to those of the rotation angle detector 1 according to first embodiment, and further includes a subtracter 121 and a pseudo three-dimensional harmonics generator 122. Note that the rotation angle detector 120 does not include the arithmetic unit 3 and the initial phase detector 5 that the rotation angle detector 1 according to first embodiment includes.

The hall effect sensors 20a and 20b are arranged to have a phase difference of 120 degrees like hall effect sensors that are originally provided for the brushless DC motor 30 to transmit U-phase detection signals HU+/HU− and V-phase detection signals HV+/HV− to the amplifiers 21a and 21b. The amplifiers 21a and 21b convert the received signals into single-end signals, and transmit the converted signals to the rotation angle detector 120 as detection signals HU0 and HV0.

In the rotation angle detector 120, the signal correctors 2a and 2b correct the amplitude of each of the detection signals HU0 and HV0 so as to match target amplitude Atgt, and remove the offset of these signals. Then, the signal correctors 2a and 2b transmit the resultant signals to the orthogonalization unit 4 as detection signals HU and HV.

The orthogonalization unit 4 orthogonalizes the removed detection signal HU and the removed detection signal HV to generate the X-axis orthogonal signal X0 and the Y-axis orthogonal signal Y0. Then, the generate X-axis orthogonal signal is output to the subtracter 121, and Y-axis orthogonal signal is output to the Y-amplitude corrector 6b of the amplitude corrector 6.

In a similar manner to hall effect sensors that are originally provided for the brushless DC motor 30, the phase difference φuv between the detection signals HU0 and HV0 output from the hall effect sensors 20a and 20b is −2π/3. Here, the X-axis orthogonal signal X0 and the Y-axis orthogonal signal Y0 are determined as in formula 9 below with reference to formula 2, and no three-dimensional harmonics are included in the Y-axis orthogonal signal.

$$X0 = A_1 \sin(\theta - \pi/3) - 2A_3 \sin(3\theta - \pi)$$

$$Y0 = -\sqrt{3}/2 \cos(\theta - \pi/3) \quad \text{[Formula 9]}$$

For this reason, the subtracter 121 is arranged only after the adder 41 of the orthogonalization unit 4, which outputs X-axis orthogonalized signal X0, to remove three-dimensional harmonics from the X-axis orthogonal signal X0. Accordingly, three-dimensional harmonics are removed from the detection signals HU0 and HV0 in the rotation angle detector 120 according to the fourth embodiment.

The subtracter 121 receives pseudo three-dimensional harmonics A3·sin 3θp from the pseudo three-dimensional harmonics generator 122. The subtracter 121 subtracts the pseudo three-dimensional harmonics A3·sin 3θp from the X-axis orthogonal signal X0 to remove three-dimensional harmonics, and transmits the X-axis orthogonal signal X0' to the X-amplitude corrector 6a of the amplitude corrector 6.

The pseudo three-dimensional harmonics generator 122 only includes the multiplier 122a, and receives only the sine wave sin 3θp from the sine-wave generator 12, in addition to the three-dimensional harmonics amplitude A3(n) output from the three-dimensional harmonics amplitude calculator 13. The multiplier 122a multiplies the three-dimensional harmonics amplitude A3(n) and the sine wave sin 3θp, and transmits pseudo three-dimensional harmonics A3·sin 3θp to the subtracter 121.

The sine-wave generator 12 calculates sin θ and cos θ based only on the detection angle θp received from the angle setting unit 10, and transmits the obtained sin θ and cos θ to the detected-angle multiplier 7. Moreover, the sine-wave generator 12 generates sine wave sin 3θ, and transmits the generated sine wave sin 3θ to the multiplier 122a.

As described above, in the rotation angle detector 120 according to the fourth embodiment, the hall effect sensors (rotation detecting units) 20a and 20b are arranged to have a phase difference of 120 degree.

Accordingly, the rotation angle detector 120 can precisely detect the rotation angle θ of the rotating body 31 of the brushless DC motor 30, at low cost.

In the first to fourth embodiments described above, the focus is on three-dimensional harmonics, and such three-dimensional harmonics are removed from detection signals.

Accordingly, harmonics can effectively be removed at low cost, and the rotation angle of the rotating body 31 can precisely be detected.

In the first, third, and fourth embodiments, the orthogonalization unit (vector arithmetic unit) 4 determines vectors of the X-axis orthogonal signal X0 and the Y-axis orthogonal signal Y0 that correspond to the rotation angle θ of the rotating body 31, according to the detection signals whose harmonics are removed by the arithmetic unit 3. Moreover, in those embodiments, the detected-angle multiplier 7 and the adder/subtracter 8 multiply the sine wave output from the sine-wave generator 12 by the above vector to generate rotation vectors X' and Y', and the angle setting unit 10 sets the detection angle θp in accordance with the rotation vector Y'. The sine-wave generator 12 generates sine wave by using the detection angle θp, and the pseudo three-dimensional harmonics generator 14 generates three-dimensional harmonics by using the generated sine wave.

By so doing, the sine-wave generator 12 is more effectively used, and an inexpensive small circuit configuration can be achieved.

In the first, second, and third embodiments, the initial phase detector 5 detects the initial phase of the detection signal where the detection angle θp is a periodic function of one cycle, and the sine-wave generator 12 generates the sine wave based on the initial phase.

Accordingly, even when the initial phase of the detection angle θp is unknown, pseudo three-dimensional harmonics can precisely be generated to remove three-dimensional harmonics from the detection signal.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. A rotation angle detector comprising:
a plurality of rotation detecting units provided for a rotating body to output a plurality of detection signals that vary depending on a rotation angle of the rotating body, the detection signals having phases different from each other;
an angle detection unit to detect the rotation angle of the rotating body according to the detection signals, and to output the detected rotation angle as a detection angle;
a pseudo harmonics generator to generate pseudo harmonics based on a multiplied detection angle obtained by multiplying the detection angle by a specified number;
a harmonics removal unit to remove, from each one of the detection signals, the pseudo harmonics generated by the pseudo harmonics generator, to output corrected detection signals from which the pseudo harmonics are removed to the angle detection unit, the detection angle being generated based on the corrected detection signals; and
a pseudo harmonics amplitude generator to generate amplitude of the pseudo harmonics, the pseudo harmonics amplitude generator including:
an amplitude detector to detect an amplitude value of desired one of the detection signals at a desired timing; and
a harmonics amplitude value detector to determine a harmonics amplitude value of the harmonics included in the detection signal, according to the amplitude value of the detection signal, wherein
the pseudo harmonics generator generates the pseudo harmonics of an amplitude value that corresponds to the harmonics amplitude value.

2. The rotation angle detector according to claim 1, wherein
the amplitude detector detects an amplitude value of one of two detection signals of the detection signals at the timing when amplitude values of the two detection signals match.

3. The rotation angle detector according to claim 1, further comprising:
an orthogonalization unit to calculate and output orthogonalized signals based on the corrected detection signals received from the harmonics removal unit; and
an amplitude corrector to correct two orthogonalized signals of the orthogonalized signals so as to match a specified target amplitude value, wherein
the amplitude detector detects an amplitude value of one of the two orthogonalized signals at the timing when amplitude values of the two orthogonalized signals match.

4. The rotation angle detector according to claim 1, further comprising:
an orthogonalization unit to calculate and output orthogonalized signals based on the corrected detection signals received from the harmonics removal unit; and
an amplitude corrector to correct the two orthogonalized signals so as to match a specified target amplitude value, wherein
the amplitude detector detects an amplitude value of one of the two orthogonalized signals at the timing when a phase where amplitude values of the two orthogonalized signals match and the detection angle match.

5. The rotation angle detector according claim 1, further comprising
an amplitude adjusting unit to correct amplitude of the corrected detection signal, which is output from the harmonics removal unit, so as to match a specified target amplitude, and to output a harmonics removal detecting signal, wherein
the amplitude detector detects an amplitude value of one of the two harmonics removal detecting signals at the timing when amplitude values of the two harmonics removal detecting signals match, and
the harmonics amplitude value detector performs PID control on a difference among the amplitude detected by the amplitude detector, a phase difference in the detection signal, and target detection-signal amplitude of the detection signal that corresponds to the target amplitude.

6. The rotation angle detector according to claim 3, wherein
the harmonics amplitude value detector performs PID control on a difference among the amplitude detected by the amplitude detector, and target detection-signal amplitude of the detection signal that corresponds to the target amplitude.

7. The rotation angle detector according to claim 3, wherein
the harmonics amplitude value detector determines the harmonics amplitude value by performing PID control on a difference, in one cycle of the detection angle, between the average absolute value of the amplitude value of the two orthogonalized signals detected by the amplitude detector and the target amplitude.

8. The rotation angle detector according to claim 1, wherein
the rotation detecting units are arranged such that a phase difference among the output detection signals has a multiple of $\pi/3$.

9. A method of detecting a rotation angle, the method comprising:
detecting a rotation angle of a rotating body according to a plurality of detection signals that vary depending on the rotation angle of the rotating body and have phases different from each other, to output the detected rotation angle as a detection angle;
generating pseudo harmonics based on a multiplied detection angle obtained by multiplying the detection signal by a specified number;
removing the pseudo harmonics from the detection signals, to output corrected detection signals from which the pseudo harmonics are removed to the detecting of the rotation angle, the detection angle being generated based on the corrected detection signals; and
generating amplitude of the pseudo harmonics by
detecting an amplitude value of desired one of the detection signals at a desired timing; and
determining a harmonics amplitude value of the harmonics included in the detection signal, according to the amplitude value of the detection signal, wherein
the pseudo harmonics of an amplitude value that corresponds to the harmonics amplitude value are generated.

10. An image forming apparatus comprising:
a rotation angle detecting device to detect a rotation angle of a rotation axis to control rotation of the rotation axis, the rotation angle detecting device being the rotation angle detector according to claim 1; and
a driving mechanism to be driven by the rotation of the rotation axis.

11. A rotation angle detector for detecting a rotation angle of a rotating body, the rotation angle detector comprising:
    circuitry configured to
    output a plurality of detection signals that vary depending on the rotation angle of the rotating body, the detection signals having phases different from each other;
    detect the rotation angle of the rotating body according to the detection signals, and output the detected rotation angle as a detection angle;
    generate pseudo harmonics based on a multiplied detection angle obtained by multiplying the detection angle by a specified number;
    remove, from each one of the detection signals, the pseudo harmonics generated by the pseudo harmonics generator, to output corrected detection signals from which the pseudo harmonics are removed, the detection angle being generated based on the corrected detection signals; and
    generate amplitude of the pseudo harmonics by
        detecting an amplitude value of desired one of the detection signals at a desired timing; and
        determining a harmonics amplitude value of the harmonics included in the detection signal, according to the amplitude value of the detection signal wherein the circuitry is configured to generate the pseudo harmonics of an amplitude value that corresponds to the harmonics amplitude value.

\* \* \* \* \*